US012812568B2

(12) United States Patent
Beckman et al.

(10) Patent No.: US 12,812,568 B2
(45) Date of Patent: Nov. 24, 2026

(54) AUTOMATIC GAIN CONTROL FOR SUB-BAND FULL DUPLEX TRANSMISSIONS

(71) Applicant: QUALCOMM Incorporated, San Diego, CA (US)

(72) Inventors: James Beckman, La Jolla, CA (US); Jae Ho Ryu, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 398 days.

(21) Appl. No.: 18/538,361

(22) Filed: Dec. 13, 2023

(65) Prior Publication Data

US 2025/0203540 A1 Jun. 19, 2025

(51) Int. Cl.

*H04W 52/52* (2009.01)
*H04W 52/36* (2009.01)
*H04W 52/42* (2009.01)

(52) U.S. Cl.

CPC ......... *H04W 52/52* (2013.01); *H04W 52/365* (2013.01); *H04W 52/42* (2013.01)

(58) Field of Classification Search

CPC ... H04W 52/52; H04W 52/38; H04W 52/386; H04W 52/54; H04W 52/365; H04W 52/36; H04W 52/42

See application file for complete search history.

(56) References Cited

U.S. PATENT DOCUMENTS

2023/0319728 A1* 10/2023 Zhou .................... H04L 5/1461 370/277

OTHER PUBLICATIONS (KR 100668663 B1), Kim et al., Apparatus and Method for Automatic Gain Control of Mobile Station in OFDM System, Jan. 2007, pp. 1-12 (Year: 2007).*

* cited by examiner

*Primary Examiner* — Keith Ferguson

(74) *Attorney, Agent, or Firm* — Harrity & Harrity, LLP

(57) ABSTRACT

Various aspects of the present disclosure generally relate to wireless communication. In some aspects, a network node may receive an automatic gain control (AGC) headroom capability that is supported by a first user equipment (UE). The network node may adjust, based at least in part on the AGC headroom capability, a transmission power level for an uplink transmission from a second UE that is transmitted in a same orthogonal frequency division multiplexing (OFDM) symbol as a downlink transmission to the first UE. Numerous other aspects are described.

30 Claims, 21 Drawing Sheets

700

AUTOMATIC GAIN CONTROL FOR SUB-BAND FULL DUPLEX TRANSMISSIONS

FIELD OF THE DISCLOSURE

Aspects of the present disclosure generally relate to wireless communication and specifically relate to techniques, apparatuses, and methods for automatic gain control for sub-band full duplex transmissions.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

Some aspects described herein relate to a method of wireless communication performed by a network node. The method may include receiving an automatic gain control (AGC) headroom capability that is supported by a first user equipment (UE). The method may include adjusting, based at least in part on the AGC headroom capability, a transmission power level for an uplink transmission from a second UE that is transmitted in a same orthogonal frequency division multiplexing (OFDM) symbol as a downlink transmission to the first UE.

Some aspects described herein relate to a method of wireless communication performed by a UE. The method may include transmitting an AGC headroom capability that is supported by the UE to a network node. The method may include receiving a downlink transmission from the network node that is based at least in part on the AGC headroom capability.

Some aspects described herein relate to a method of wireless communication performed by a network node. The method may include receiving a first indication of an AGC offset capability that is supported by a UE. The method may include transmitting a second indication of an AGC offset that is directed to the UE.

Some aspects described herein relate to a method of wireless communication performed by a UE. The method may include transmitting a first indication of an AGC offset capability that is supported by the UE. The method may include receiving a second indication of an AGC offset that is directed to the UE.

Some aspects described herein relate to a method of wireless communication performed by a UE. The method may include calculating one or more measurement metrics based at least in part on one or more received signals associated with sub-band full duplex (SBFD) operation. The method may include updating one or more AGC loops based at least in part on the one or more measurement metrics.

Some aspects described herein relate to a method of wireless communication performed by a network node. The method may include calculating one or more cross-link interference (CLI) metrics that are based at least in part on a first UE and a second UE. The method may include scheduling the first UE or the second UE based at least in part on the one or more CLI metrics.

Some aspects described herein relate to an apparatus for wireless communication at a network node. The apparatus may include one or more memories and one or more processors coupled to the one or more memories. The one or more processors may be configured to receive an AGC headroom capability that is supported by a first UE. The one or more processors may be configured to adjust, based at least in part on the AGC headroom capability, a transmission power level for an uplink transmission from a second UE that is transmitted in a same OFDM symbol as a downlink transmission to the first UE.

Some aspects described herein relate to an apparatus for wireless communication at a UE. The apparatus may include one or more memories and one or more processors coupled to the one or more memories. The one or more processors may be configured to transmit an AGC headroom capability that is supported by the UE to a network node. The one or more processors may be configured to receive a downlink transmission from the network node that is based at least in part on the AGC headroom capability.

Some aspects described herein relate to an apparatus for wireless communication at a network node. The apparatus may include one or more memories and one or more processors coupled to the one or more memories. The one or more processors may be configured to receive a first indication of an AGC offset capability that is supported by a UE. The one or more processors may be configured to transmit a second indication of an AGC offset that is directed to the UE.

Some aspects described herein relate to an apparatus for wireless communication at a UE. The apparatus may include one or more memories and one or more processors coupled to the one or more memories. The one or more processors may be configured to transmit a first indication of an AGC offset capability that is supported by the UE. The one or more processors may be configured to receive a second indication of an AGC offset that is directed to the UE.

Some aspects described herein relate to an apparatus for wireless communication at a UE. The apparatus may include one or more memories and one or more processors coupled to the one or more memories. The one or more processors may be configured to calculate one or more measurement metrics based at least in part on one or more received signals associated with SBFD operation. The one or more processors may be configured to update one or more AGC loops based at least in part on the one or more measurement metrics.

Some aspects described herein relate to an apparatus for wireless communication at a network node. The apparatus may include one or more memories and one or more processors coupled to the one or more memories. The one or more processors may be configured to calculate one or more CLI metrics that are based at least in part on a first UE and a second UE. The one or more processors may be configured to schedule the first UE or the second UE based at least in part on the one or more CLI metrics.

Some aspects described herein relate to a non-transitory computer-readable medium that stores a set of instructions for wireless communication by a network node. The set of instructions, when executed by one or more processors of the network node, may cause the network node to receive an AGC headroom capability that is supported by a first UE. The set of instructions, when executed by one or more processors of the network node, may cause the network node to adjust, based at least in part on the AGC headroom capability, a transmission power level for an uplink transmission from a second UE that is transmitted in a same OFDM symbol as a downlink transmission to the first UE.

Some aspects described herein relate to a non-transitory computer-readable medium that stores a set of instructions for wireless communication by a UE. The set of instructions, when executed by one or more processors of the UE, may cause the UE to transmit an AGC headroom capability that is supported by the UE to a network node. The set of instructions, when executed by one or more processors of the UE, may cause the UE to receive a downlink transmission from the network node that is based at least in part on the AGC headroom capability.

Some aspects described herein relate to a non-transitory computer-readable medium that stores a set of instructions for wireless communication by a network node. The set of instructions, when executed by one or more processors of the network node, may cause the network node to receive a first indication of an AGC offset capability that is supported by a UE. The set of instructions, when executed by one or more processors of the network node, may cause the network node to transmit a second indication of an AGC offset that is directed to the UE.

Some aspects described herein relate to a non-transitory computer-readable medium that stores a set of instructions for wireless communication by a UE. The set of instructions, when executed by one or more processors of the UE, may cause the UE to transmit a first indication of an AGC offset capability that is supported by the UE. The set of instructions, when executed by one or more processors of the UE, may cause the UE to receive a second indication of an AGC offset that is directed to the UE.

Some aspects described herein relate to a non-transitory computer-readable medium that stores a set of instructions for wireless communication by a UE. The set of instructions, when executed by one or more processors of the UE, may cause the UE to calculate one or more measurement metrics based at least in part on one or more received signals associated with SBFD operation. The set of instructions, when executed by one or more processors of the UE, may cause the UE to update one or more AGC loops based at least in part on the one or more measurement metrics.

Some aspects described herein relate to a non-transitory computer-readable medium that stores a set of instructions for wireless communication by a network node. The set of instructions, when executed by one or more processors of the network node, may cause the network node to calculate one or more CLI metrics that are based at least in part on a first UE and a second UE. The set of instructions, when executed by one or more processors of the network node, may cause the network node to schedule the first UE or the second UE based at least in part on the one or more CLI metrics.

Some aspects described herein relate to an apparatus for wireless communication. The apparatus may include means for receiving an AGC headroom capability that is supported by a first UE. The apparatus may include means for adjusting, based at least in part on the AGC headroom capability, a transmission power level for an uplink transmission from a second UE that is transmitted in a same OFDM symbol as a downlink transmission to the first UE.

Some aspects described herein relate to an apparatus for wireless communication. The apparatus may include means for transmitting an AGC headroom capability that is supported by the UE to a network node. The apparatus may include means for receiving a downlink transmission from the network node that is based at least in part on the AGC headroom capability.

Some aspects described herein relate to an apparatus for wireless communication. The apparatus may include means for receiving a first indication of an AGC offset capability that is supported by a UE. The apparatus may include means for transmitting a second indication of an AGC offset that is directed to the UE.

Some aspects described herein relate to an apparatus for wireless communication. The apparatus may include means for transmitting a first indication of an AGC offset capability that is supported by the UE. The apparatus may include means for receiving a second indication of an AGC offset that is directed to the UE.

Some aspects described herein relate to an apparatus for wireless communication. The apparatus may include means for calculating one or more measurement metrics based at least in part on one or more received signals associated with SBFD operation. The apparatus may include means for updating one or more AGC loops based at least in part on the one or more measurement metrics.

Some aspects described herein relate to an apparatus for wireless communication. The apparatus may include means for calculating one or more CLI metrics that are based at least in part on a first UE and a second UE. The apparatus may include means for scheduling the first UE or the second UE based at least in part on the one or more CLI metrics.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

DETAILED DESCRIPTION

Figure 1:
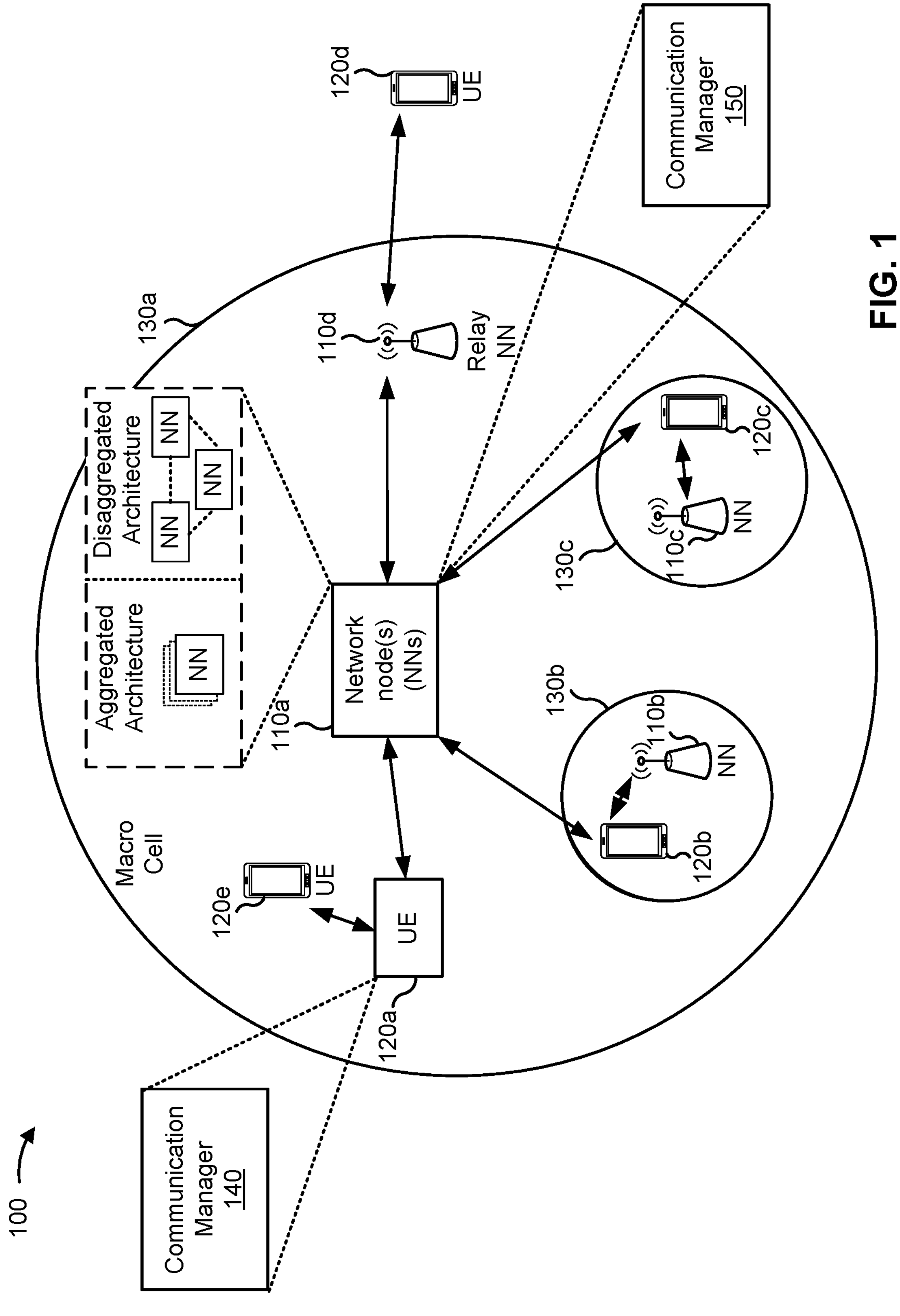
FIG. 1 is a diagram illustrating an example of a wireless communication network, in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

A receiver in a wireless communication device (WCD), such as a user equipment (UE) and/or a network node, enables the WCD to capture and process wireless signals. The receiver may include multiple stages to improve reception and/or decoding of information carried by a wireless signal. To illustrate, the multiple stages may be configured to reduce interference in the signal and/or increase a signal strength.

As one example, a receiver may include a low noise amplifier (LNA) to increase a signal strength of an analog signal in a manner that maintains and/or minimally degrades a signal-to-noise (SNR) ratio. As another example, the receiver may include a digital variable gain amplifier (DVGA) that may digitally adjust a gain of digital samples. Each amplifier may be controlled based at least in part on a respective feedback loop, such as by an automatic gain control (AGC) outer feedback loop that may be used to configure the LNA and/or an AGC inner feedback loop that may be used to configure the DVGA. To illustrate, the AGC feedback loops may provide feedback to mitigate saturating hardware.

In some aspects, the AGC feedback loops may be tracked and/or updated based at least in part on an algorithm that compares one or more measurement metrics, such as a first received signal strength indicator (RSSI) metric that is based at least in part on a periodic synchronization signal block (SSB) and/or a second RSSI metric that is based at least in part on one or more downlink (DL) slots (e.g., a physical downlink shared channel (PDSCH) DL slot). A WCD, such as a UE, may compare the first RSSI and the second RSSI, and update an AGC feedback loop using the maximum RSSI.

A same receiver chain may be used to cover sub-band full duplex (SBFD) transmissions and non-SBFD transmission, and setting the AGC feedback loop(s) in the receiver chain without considering the different types of transmissions being received may result in saturation in some of the stages, such as the LNA and/or receiver stages after the DVGA. To illustrate, inter-UE cross-link interference (CLI) that occurs based at least in part on an SBFD transmission, such as an uplink (UL) transmission that occurs in a same orthogonal frequency division multiplexing (OFDM) symbol as a DL transmission, may result in the receiver observing interference at a high power level during DL reception. Without considering reception of SBFD transmissions and/or inter-UE CLI, a WCD may configure the AGC feedback loop(s) using non-SBFD measurement metrics. Accordingly, the WCD may receive a DL transmission (e.g., in an SBFD transmission) that includes inter UE CLI using a receiver that was configured using non-SBFD transmissions and/or non-SBFD measurement metrics. Accordingly, the receiver may not accommodate inter-UE CLI that has a higher received power level, resulting in saturated hardware, distorted signals, and/or recovery errors.

Various aspects relate generally to provide AGC for SBFD transmissions. Some aspects more specifically relate to a UE indicating an AGC capability, and a network node configuring a wireless network (e.g., via scheduling and/or by configuring the UE) to mitigate saturation at the UE. Alternate or additional aspects may relate to a UE configuring one or more AGC feedback loops using one or more measurement metrics calculated by the UE. In some aspects, a network node may receive AGC headroom capability that is supported by a first UE, and the AGC headroom capability may be based at least in part on a receiver at the first UE. Based at least in part on receiving the AGC headroom capability, the network node may adjust a transmission power level for a UL transmission from a second UE that is transmitted in a same OFDM symbol as a DL transmission to the first UE. By adjusting the transmission power level of the UL transmission from the second UE, the network node may reduce an amount of inter-UE CLI observed by the first UE in the DL transmission, and mitigate hardware saturation at the first UE.

Alternatively, or additionally, a first UE may transmit an AGC headroom capability that is supported by the first UE, such as by transmitting the AGC headroom capability to a network node. In some aspects, a DL transmission from the network node may be based at least in part on the AGC headroom capability. For instance, the DL transmission may include less inter-CLI interference from a second UE in a same OFDM symbol as the DL transmission based at least in part on the network node using the AGC headroom capability to reduce a power level of an UL transmission by the second UE, resulting in the mitigation of hardware saturation at the first UE.

Alternatively, or additionally, in some aspects, a UE may transmit a first indication of an AGC offset capability that is supported by the UE, and the AGC offset capability may be based at least in part on hardware at the UE. The UE may receive a second indication of an AGC offset that is directed to the UE. In some aspects, a network node may transmit the second indication of the AGC offset, and the network node may calculate a value for the AGC offset based at least in part on calculating expected inter-UE CLI interference. The UE may use the AGC offset to configure one or more AGC feedback loops, such as an outer AGC feedback loop and/or an inner AGC feedback loop, to mitigate hardware saturation at the UE.

Alternatively, or additionally, in some aspects, a UE may calculate one or more measurement metrics based at least in part on one or more received signals that are associated with SBFD operation. The UE may update one or more AGC feedback loops based at least in part on the one or more measurement metrics. As one non-limiting example, the UE may select a maximum from the one or more measurement metrics that evaluate an SBFD transmission and/or a non-SBFD transmission, and configure the AGC feedback loops based at least in part on the maximum to mitigate hardware saturation at the UE.

Alternatively, or additionally, a network node may calculate one or more CLI metrics that are based at least in part on a first UE and a second UE. In some aspects, the network node may receive an AGC headroom capability that is supported by the first UE or the second UE, and analyze the CLI metric(s) to identify whether the AGC headroom capability is satisfied. The network node may schedule the first UE and/or the second UE based at least in part on the one or more CLI metrics satisfying and/or failing to satisfy the AGC headroom capability, and the scheduling may be directed at reducing inter-UE CLI and/or to mitigating hardware saturation at the first UE and/or the second UE.

Configuring one or more AGC feedback loop(s) based at least in part on inter-UE CLI (examples of which are provided above and below) may mitigate hardware saturation at a UE and/or satisfy one or more signal-to-quantization-noise ratio (SQNR) conditions at the UE. Mitigating hardware saturation and/or satisfying the SQNR condition(s) may mitigate distorted signals and/or reduce recovery errors.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110*a*, a network node 110*b*, a network node 110*c*, and a network node 110*d*. The network nodes 110 may support communications with multiple UEs 120, shown as a UE 120*a*, a UE 120*b*, a UE 120*c*, a UE 120*d*, and a UE 120*e*.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHz), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHz, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110*a* may be a macro network node for a macro cell 130*a*, the network node 110*b* may be a pico network node for a pico cell 130*b*, and the network node 110*c* may be a femto network node for a femto cell 130*c*. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an extended reality (XR) device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs". An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, eMBB, and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120*a* and UE 120*e*) may communicate directly with one another using sidelink communications (for example, without communicating by way of a network node 110 as an intermediary). As an example, the UE 120*a* may directly transmit data, control information, or other signaling as a sidelink communication to the UE 120*e*. This is in contrast to, for example, the UE 120*a* first transmitting data in an UL communication to a network node 110, which then transmits the data to the UE 120*e* in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, a network node (e.g., a network node 110) may include a communication manager 150. As described in more detail elsewhere herein, the communication manager 150 may receive an AGC headroom capability that is supported by a first UE; and adjust, based at least in part on the AGC headroom capability, a transmission power level for an uplink transmission from a second UE that is transmitted in a same OFDM symbol as a downlink transmission to the first UE.

Additionally, or alternatively, the communication manager 150 may receive a first indication of an AGC offset capability that is supported by a UE; and transmit a second indication of an AGC offset that is directed to the UE.

Additionally, or alternatively, the communication manager 150 may calculate one or more CLI metrics that are based at least in part on a first UE and a second UE; and schedule the first UE or the second UE based at least in part on the one or more CLI metrics. Additionally, or alternatively, the communication manager 150 may perform one or more other operations described herein.

In some aspects, a UE (e.g., a UE 120) may include a communication manager 140. As described in more detail elsewhere herein, the communication manager 140 may transmit an AGC headroom capability that is supported by the UE to a network node; and receive a downlink transmission from the network node that is based at least in part on the AGC headroom capability.

Additionally, or alternatively, the communication manager 140 may transmit a first indication of an AGC offset capability that is supported by the UE; and receive a second indication of an AGC offset that is directed to the UE.

Additionally, or alternatively, the communication manager 140 may calculate one or more measurement metrics based at least in part on one or more received signals associated with SBFD operation; and update one or more AGC loops based at least in part on the one or more measurement metrics. Additionally, or alternatively, the communication manager 140 may perform one or more other operations described herein.

As indicated above, FIG. 1 is provided as an example. Other examples may differ from what is described with regard to FIG. 1.

Figure 2:
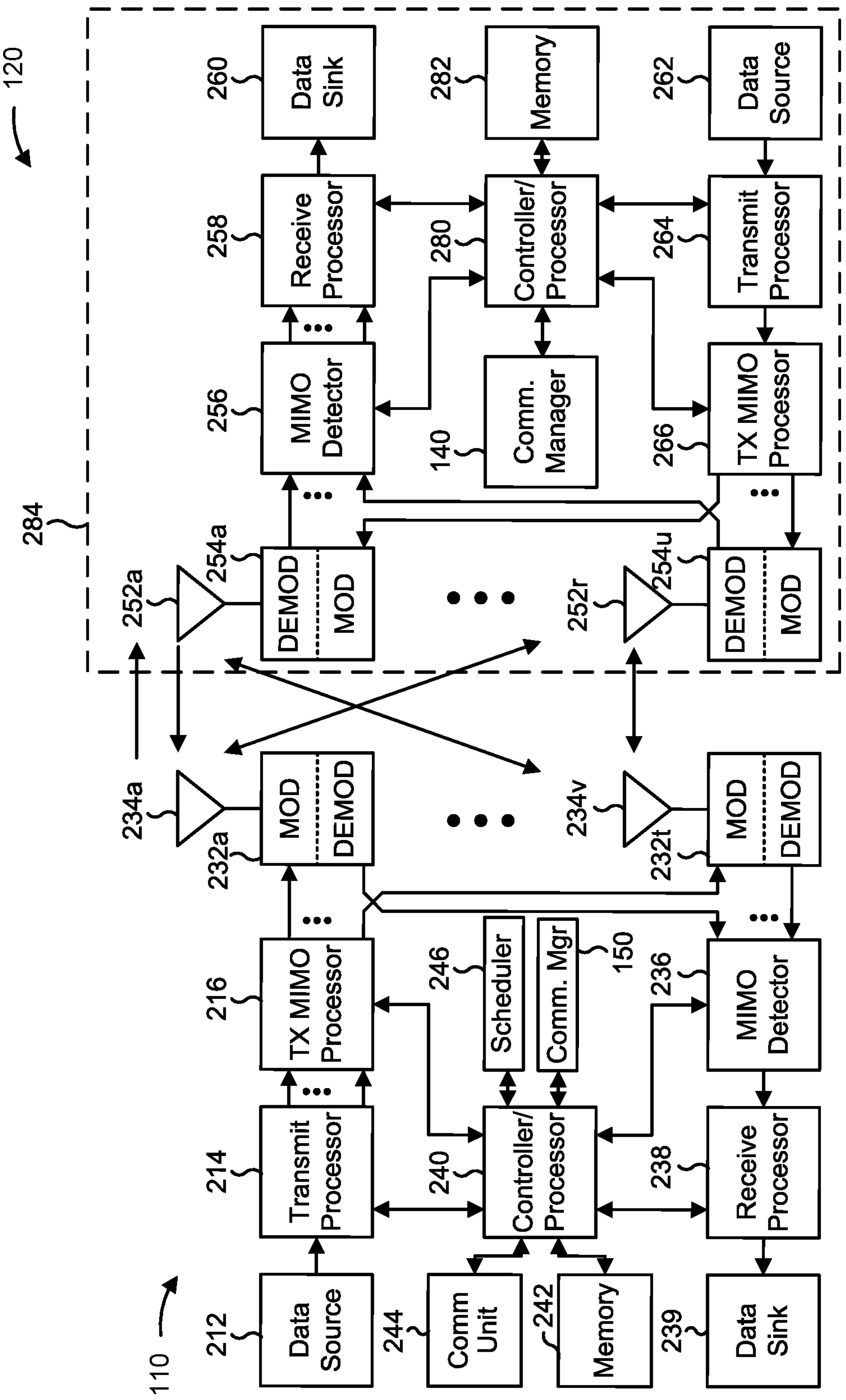
FIG. 2 is a diagram illustrating an example network node in communication with an example user equipment (UE) in a wireless network, in accordance with the present disclosure.

FIG. 2 is a diagram illustrating an example network node 110 in communication with an example UE 120 in a wireless network in accordance with the present disclosure.

As shown in FIG. 2, the network node 110 may include a data source 212, a transmit processor 214, a transmit (TX) MIMO processor 216, a set of modems 232 (shown as 232*a* through 232*t*, where t≥1), a set of antennas 234 (shown as 234*a* through 234*v*, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more modulation and coding schemes (MCSs) for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232*a* through 232*t* may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252*a* through 252*r*, where r≥1), a set of modems 254 (shown as modems 254*a* through 254*u*, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a channel quality indicator (CQI) parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254*a* through 254*u* may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

Figure 3:
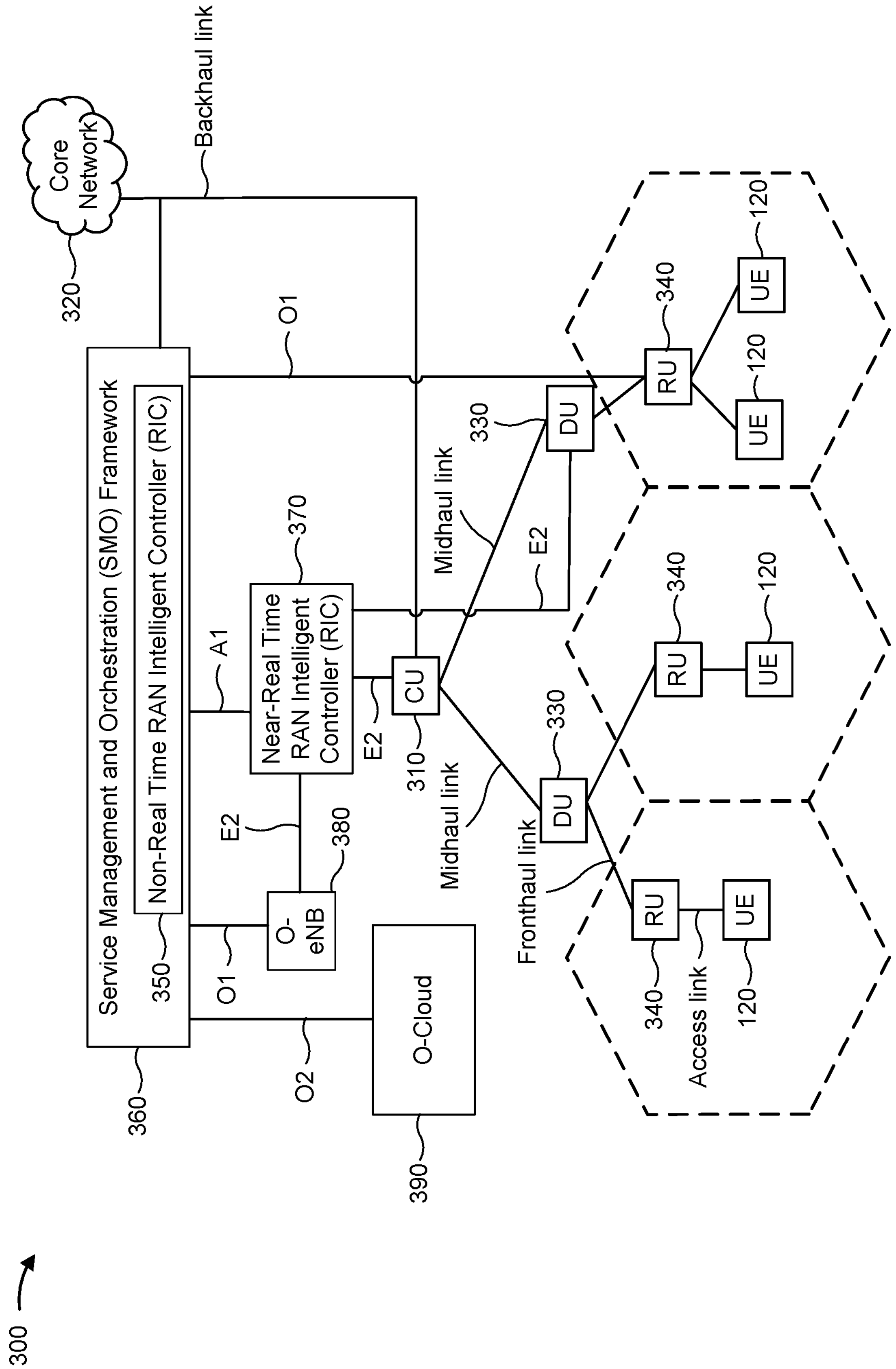
FIG. 3 is a diagram illustrating an example disaggregated base station architecture, in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUs 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU-UP units and one or more CU-CP units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, artificial intelligence and/or machine learning (AI/ML) workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

As indicated above, FIG. 3 is provided as an example. Other examples may differ from what is described with regard to FIG. 3.

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with AGC for SBFD transmissions, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 1200 of FIG. 12, process 1300 of FIG. 13, process 1400 of FIG. 14, process 1500 of FIG. 15, process 1600 of FIG. 16, process 1700 of FIG. 17, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 1200 of FIG. 12, process 1300 of FIG. 13, process 1400 of FIG. 14, process 1500 of FIG. 15, process 1600 of FIG. 16, process 1700 of FIG. 17, or other processes as described herein. In some examples, executing instructions may include running the instructions, converting the instructions, compiling the instructions, and/or interpreting the instructions, among other examples.

In some aspects, a network node (e.g., a network node 110) includes means for receiving an AGC headroom capability that is supported by a first UE; and/or means for adjusting, based at least in part on the AGC headroom capability, a transmission power level for an uplink transmission from a second UE that is transmitted in a same OFDM symbol as a downlink transmission to the first UE.

Alternatively, or additionally, the network node includes means for receiving a first indication of an AGC offset capability that is supported by a UE; and/or means for transmitting a second indication of an AGC offset that is directed to the UE.

Alternatively, or additionally, the network node includes means for calculating one or more CLI metrics that are based at least in part on a first UE and a second UE; and/or means for scheduling the first UE or the second UE based at least in part on the one or more CLI metrics. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a UE (e.g., a UE 120) includes means for transmitting an AGC headroom capability that is supported by the UE to a network node; and/or means for receiving a downlink transmission from the network node that is based at least in part on the AGC headroom capability.

Alternatively, or additionally, the UE includes means for transmitting a first indication of an AGC offset capability that is supported by the UE; and/or means for receiving a second indication of an AGC offset that is directed to the UE.

Alternatively, or additionally, the UE includes means for calculating one or more measurement metrics based at least in part on one or more received signals associated with SBFD operation; and/or means for updating one or more AGC loops based at least in part on the one or more measurement metrics. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

Figure 4:
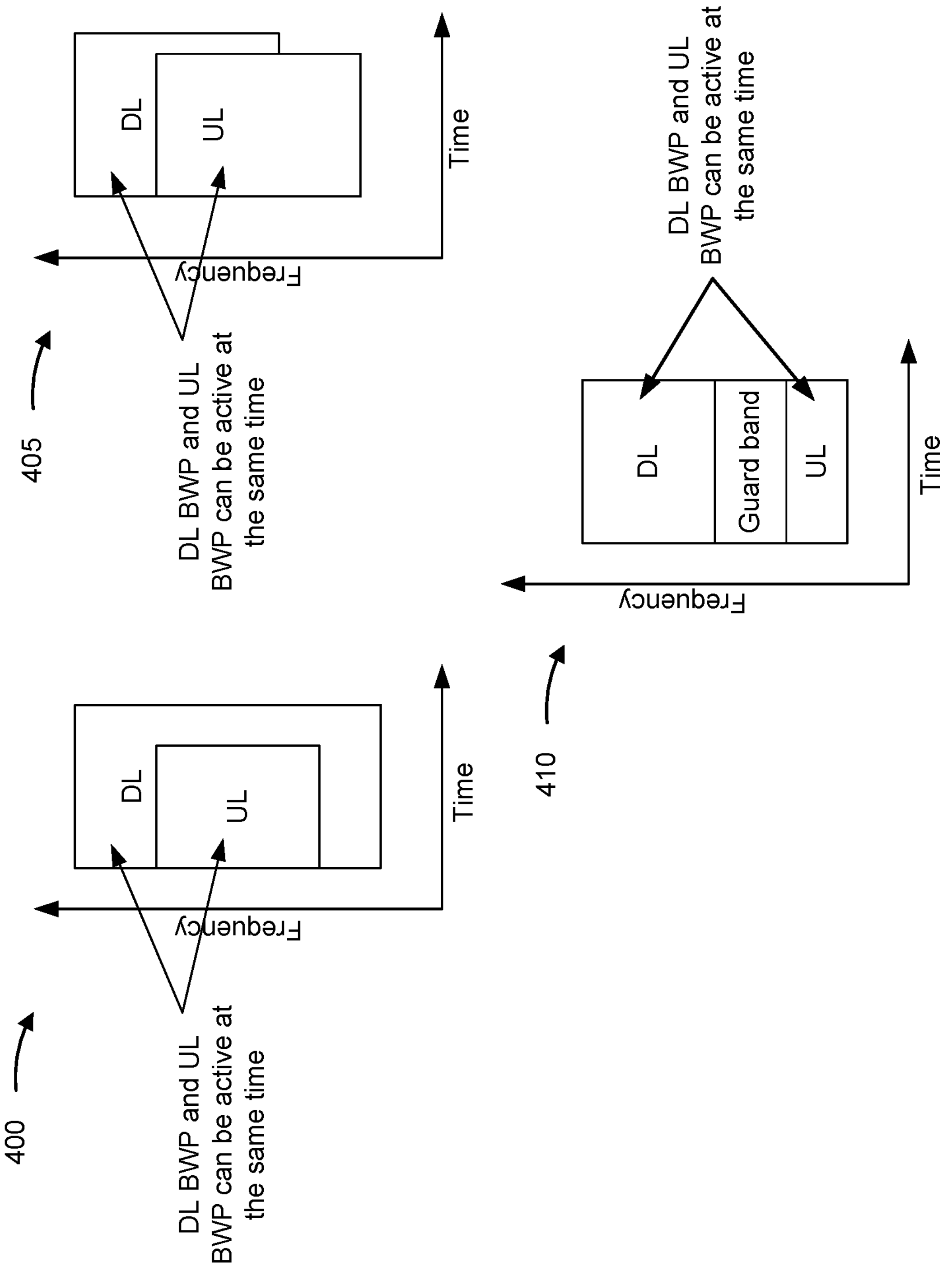
FIG. 4 is a diagram illustrating examples of full-duplex communication in a wireless network, in accordance with the present disclosure.

FIG. 4 is a diagram illustrating examples 400, 405, and 410 of full-duplex communication in a wireless network, in accordance with the present disclosure. "Full-duplex communication" in a wireless network refers to simultaneous bi-directional communication between devices in the wireless network. For example, a UE operating in a full-duplex mode may transmit an uplink communication and receive a downlink communication at the same time (e.g., in the same slot or the same symbol). "Half-duplex communication" in a wireless network refers to unidirectional communications (e.g., only downlink communication or only uplink communication) between devices at a given time (e.g., in a given slot or a given symbol).

As shown in FIG. 4, examples 400 and 405 show examples of in-band full-duplex (IBFD) communication. In IBFD, a UE may transmit an uplink communication to a base station and receive a downlink communication from the base station on the same time and frequency resources. As shown in example 400, in a first example of IBFD, the time and frequency resources for uplink communication may fully overlap with the time and frequency resources for downlink communication. As shown in example 405, in a second example of IBFD, the time and frequency resources for uplink communication may partially overlap with the time and frequency resources for downlink communication.

As further shown in FIG. 4, example 410 shows an example of sub-band full-duplex (SBFD) communication, which may also be referred to as "sub-band frequency division duplex (SBFDD)" or "flexible duplex." In SBFD, a UE may transmit an uplink communication to a base station and receive a downlink communication from the base station at the same time, but on different frequency resources. For example, the different frequency resources may be sub-bands of a frequency band, such as a time division duplexing band. In this case, the frequency resources used for downlink communication may be separated from the frequency resources used for uplink communication, in the frequency domain, by a guard band.

"SBFD operation" may denote simultaneous transmission and reception on a sub-band basis, such as simultaneous transmission and reception of DL and UL, and may reduce data transfer latencies. As one example, SBFD operation may enable transmission of an UL channel and/or an UL signal (e.g., transmitted by a UE 120 and/or received by a network node 110) in an UL sub-band that occurs during a same time span (e.g., an OFDM symbol, a mini slot, and/or a slot) as a legacy DL slot. "Legacy DL slot" may denote a slot that is dedicated to a DL transmission, does not support simultaneous UL transmission, and/or, prior to SBFD, may not be assigned for use by an UL transmission. Alternatively, or additionally, SBFD operation may enable reception of a DL channel and/or a DL signal in a DL sub-band that occurs during a same time span as a legacy UL slot. "Legacy UL slot" may denote a slot that is dedicated to a UL transmission, does not support simultaneous DL transmission, and/or, prior to SBFD, may not be assigned for use by an DL transmission. In some aspects, SBFD operation may provide the ability to dynamically adapt how an air interface resource may be assigned to UL and/or DL transmission. To illustrate, a legacy DL slot may only be used for a DL transmission and a legacy UL slot may only be used for an UL slot. An SBFD slot may provide more flexibility relative to a legacy DL slot and a legacy UL slot by enabling a network node to adapt and/or assign a corresponding air interface resource of the SBFD slot to either an UL transmission and/or a DL transmission. For instance, the network node may dynamically assign the SBFD slot based at least in part on UL traffic having a higher volume relative to DL traffic (or vice versa).

As indicated above, FIG. 4 is provided as an example. Other examples may differ from what is described with respect to FIG. 4.

Figure 5:
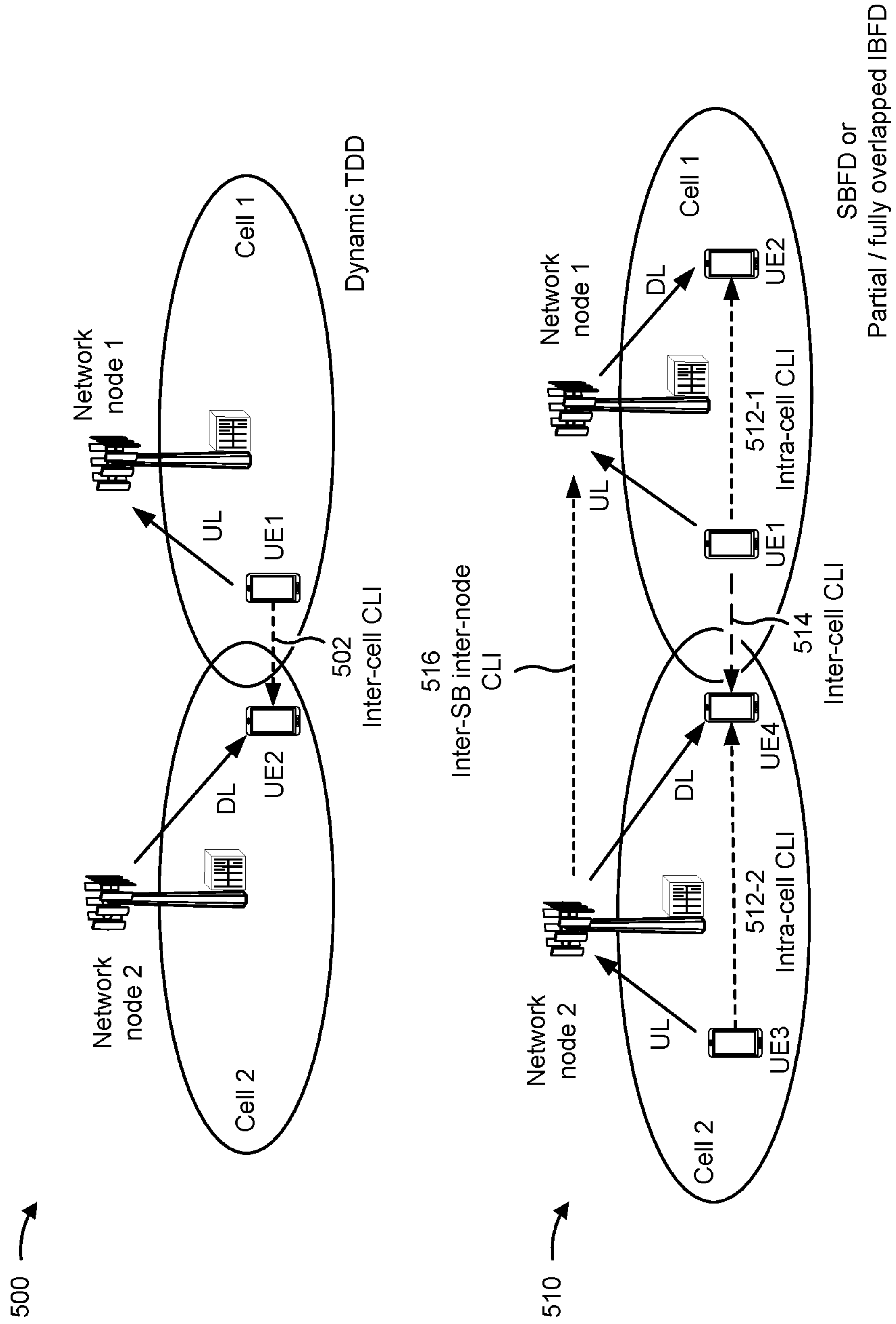
FIG. 5 is a diagram illustrating examples relating to various types of cross-link interference, in accordance with the present disclosure.

FIG. 5 is a diagram illustrating examples 500 and 510 relating to various types of CLI, in accordance with the present disclosure.

SBFD combined with dynamic time division duplex (D-TDD) may allow a network node to dynamically and/or flexibly change air interface resource allocations between uplink (UL) communications and downlink (DL) communications based on a variety of factors, such as a throughput demand, a data transfer latency condition, and/or a communication prioritization. The ability to dynamically and/or flexibly change air interface resource allocations may enable the network node to concurrently service UEs with different operating conditions (e.g., a prioritization condition, a data transfer latency condition, a data throughput condition, and/or a reliability condition) in a more efficient manner relative to legacy TDD communications. However, dynamically modifying an assignment of an air interface resource (e.g., from DL to UL and/or vice versa) may result in CLI.

Example 500 shows an example of D-TDD communication. As shown in example 500, and based at least in part on D-TDD being implemented, neighboring cells (e.g., cell 1 provided by a first network node and cell 2 provided by a second network node) may use different TDD configurations to communicate with UEs, which may result in an uplink communication between a first UE (shown as UE1) and a first network node (shown as network node 1) in a same transmission time interval (TTI) as a downlink communication between a second network node (shown as network node 2) and a second UE (shown as UE2). Communications in different transmission directions (for example, DL versus UL) in the same TTI may interfere with one another, sometimes referred to as CLI. Interference with reception of a downlink communication by one UE caused by transmission of an uplink communication by another UE may be referred to as UE-to-UE CLI or inter-UE CLI.

For example, as shown by reference number 502, in the D-TDD scenario, transmission of the uplink communication in a symbol or a slot by UE1 in cell 1 may interfere with reception of the downlink communication in the symbol or the slot by UE2 in cell 2. Such interference may be referred to as inter-cell UE-to-UE CLI or inter-cell inter-UE CLI.

Example 510 shows an example of full duplex (FD) communication, such as SBFD, fully overlapping IBFD, or partial overlapping IBFD. As shown by reference number 512-1 and reference number 512-2, in an FD scenario, transmission of an uplink communication in an SBFD or IBFD slot or symbol by one UE in a cell may interfere with reception of a downlink communication in the SBFD or IBFD slot or symbol by another UE in the cell. For example, transmission of an uplink communication in an SBFD or IBFD slot or symbol by a first UE (UE1) in a first cell (cell 1) may interfere with reception of a downlink communication in the SBFD or IBFD slot or symbol by a second UE (UE2) in cell 1 as shown by reference number 512-1. As another example, transmission of an uplink communication in an SBFD or IBFD slot or symbol by a third UE (UE3) in a second cell (cell 2) may interfere with reception of a downlink communication in the SBFD or IBFD slot or symbol by a fourth UE (UE4) in cell 2 as shown by reference number 512-2. Such interference may be referred to as intra-cell UE-to-UE CLI or intra-cell inter-UE CLI. In an SBFD scenario, transmission of an uplink communication on an uplink sub-band (SB) in an SBFD symbol or slot by one UE in a cell (e.g., UE1 and/or UE3) may interfere with reception of a downlink communication on a downlink SB in the SBFD symbol or slot by another UE (e.g., UE2 and/or UE4) in the cell. Such interference may be referred to as inter-SB intra-cell UE-to-UE CLI or inter-SB intra-cell inter-UE CLI.

As shown by reference number 514, in an FD scenario, transmission of a UL communication in an SBFD or an IBFD symbol or slot by UE1 in cell 1 may interfere with reception of a DL communication in the SBFD or IBFD symbol or slot by UE4 in cell 2. Such interference may be referred to as inter-cell inter-UE CLI. In an SBFD scenario, transmission of an uplink communication on an uplink SB in an SBFD symbol or slot by UE1 in cell 1 may interfere with reception of a downlink communication on a downlink SB in the SBFD symbol or slot by UE4 in cell 2. Such interference may be referred to as inter-SB inter-cell inter-UE CLI. Alternatively, or additionally, and as shown by reference number 516, transmission of a DL communication by a second network node (shown as network node 2) in an SBFD symbol, an IBFD symbol, an SBFD slot, and/or an IBFD slot transmission in a second cell (e.g., cell 2) may result in inter-SB inter-node CLI in an UL communication in the SBFD symbol, the IBFD symbol, the SBFD slot, and/or the IBFD slot that is received by a first network node (shown as network node 1) in a first cell (e.g., cell 1), or vice versa.

As described with regard to the example 500 and the example 510, a UE may experience CLI in a DL communication (e.g., the UE may be the victim of CLI), and the CLI may be based at least in part on one or more sources (e.g., one or more aggressor UEs). To illustrate, and as described with regard to the example 510, the UE4 in cell 2 may experience intra-cell CLI that is associated with the UE3 and/or inter-cell CLI that is associated with the UE1 in cell 1. That is, the UE 4 may be a victim of CLI that is associated with a first aggressor UE (e.g., the UE 3) and/or a second aggressor UE (e.g., the UE 1). Alternatively, or additionally, a UE may be a source of CLI to multiple UEs. For example, the UE 1 in cell 1 may cause first CLI to the UE 4 in cell 2 as described above and/or second CLI to UE 2 in cell 1.

In some aspects, a network node (e.g., a network node 110) may configure a UE to generate and/or report a CLI metric. As one example, the network node may configure the UE to generate a CLI RSSI metric and/or may indicate one or more air interface resources (e.g., a CLI RSSI resource) to use in generating the CLI RSSI metric. To illustrate, the network node 110 may indicate a configuration for the CLI RSSI resource by indicating any combination of a number of physical resource blocks (PRBs) as an allowed size of a measurement bandwidth (BW), a number of symbols to measure, a reference serving cell index, a periodicity and slot offset for the CLI RSSI resource, a reference carrier subcarrier spacing, a starting position (e.g., a starting symbol) of the CLI RSSI resource, and/or a starting PRB index of the measurement BW. Based at least in part on receiving the configuration from the network node, the UE may generate the CLI RSSI metric and/or report the CLI RSSI metric to the network node.

As indicated above, FIG. 5 is provided as an example. Other examples may differ from what is described with regard to FIG. 5.

Figure 6:
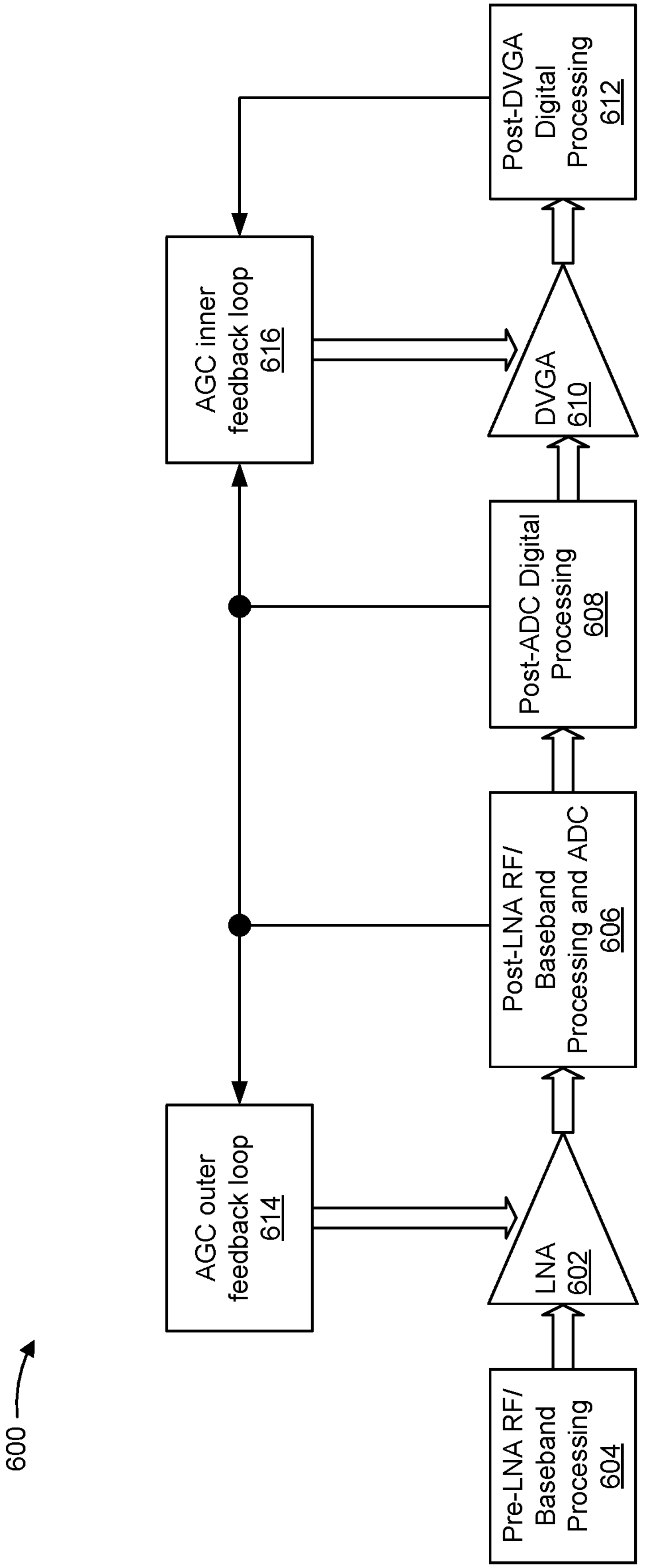
FIG. 6 is a diagram illustrating an example of a block diagram that includes one or more feedback loops that may be included in a receiver chain, in accordance with the present disclosure.

FIG. 6 is a diagram illustrating an example 600 of a block diagram that includes one or more feedback loops that may be included in a receiver chain, in accordance with the present disclosure.

A receiver in a wireless communication device (WCD), such as a UE 120, enables the WCD to capture and process wireless signals. The receiver may include multiple stages (implemented in hardware, software, and/or firmware) to improve reception and/or decoding of information carried by a wireless signal, such as by reducing interference in the signal and/or increasing a signal strength, resulting in reduced recovery errors.

To illustrate, a receiver may include a low noise amplifier (LNA) 602 to increase a signal strength in a manner that maintains and/or minimally degrades a signal-to-noise (SNR) ratio. For example, the LNA 602 may be configured to amplify a particular signal and/or signa bandwidth in a manner that mitigates amplifying noise included in the signal. Some receivers may include pre-LNA processing 604 that performs RF processing and/or RF baseband processing (e.g., RF filtering, signal amplification, and/or down conversion of an RF signal). An output of the pre-LNA processing 604 may feed into the LNA 602, and the amplified signal output of the LNA 602 may feed into post-LNA RF/baseband processing that may include an analog-to-digital converter (ADC), shown by FIG. 6 as post-LNA RF/baseband processing and ADC 606. In some aspects, the output of the post-LNA RF/baseband processing and ADC 606 may include digital samples of a baseband signal that are input to post-ADC digital processing 608. The post-ADC digital processing 608 may prepare the digital samples for input to a digital variable gain amplifier (DVGA) 610, such as by applying a digital filter to remove out-of-band signals. In some aspects, the DVGA 610 may digitally adjust a gain of the digital samples, and the output of the DVGA 610 may be used as input to post-DVGA digital processing 612, such as digital demodulation and/or decoding.

The LNA 602 may be implemented as an analog amplifier that processes an analog signal prior to digitization (e.g., via the ADC), and the DVGA 610 may be implemented as a digital amplifier that processes a digital signal. Each amplifier may be controlled based at least in part on a respective feedback loop, such as by an AGC outer feedback loop 614 and/or an AGC inner feedback loop 616. As shown by FIG. 6, the AGC outer feedback loop 614 and/or the AGC inner feedback loop 616 may be based at least in part on outputs from various stages within the receiver, such as the post-LNA RF/baseband processing and ADC 606, the post-ADC digital processing 608, and/or the post-DVGA digital processing 612. To avoid distorting signals, the respective gain configuration used by each amplifier may be based at least in part on the processing that occurs after the respective amplifier. For example, a first gain associated with the LNA 602 may be based at least in part on a first dynamic range of an ADC included in the post-LNA RF/baseband processing and ADC 606 to mitigate saturating the ADC, and a second gain associated with the DVGA 610 may be based at least in part a second dynamic range associated with digital logic that may receive the output of the DVGA 610 and/or may be included in the post-DVGA digital processing 612. Accordingly, AGC feedback loops may provide feedback to mitigate saturating hardware.

In some aspects, the AGC feedback loops, such as the AGC outer feedback loop 614 and/or the AGC inner feedback loop 616 in the receiver shown by FIG. 6, may be tracked and/or updated based at least in part on an algorithm that compares one or more measurement metrics. "Tracking" and/or "updating" an AGC feedback loop may include applying a gain value to a corresponding amplifier (e.g., the LNA 602 and/or the DVGA 610) via the feedback loop. The gain value may be selected to achieve a highest SQNR that mitigates and/or avoids signal saturation. To illustrate, a UE 120 may receive a periodic synchronization signal block (SSB) from a serving cell and, using the periodic SSB, may iteratively calculate a first RSSI (e.g., SSB RSSI). Alternatively, or additionally, the UE 120 may iteratively calculate a second RSSI, such as a PDSCH RSSI, in one or more downlink (DL) slots (e.g., every DL slot within one SSB periodicity). In some aspects, the UE 120 may compare the SSB RSSI and the PDSCH RSSI, and update an AGC feedback loop (e.g., the AGC outer feedback loop 614 and/or the AGC inner feedback loop 616) using the maximum RSSI out of the SSB RSSI and the PDSCH RSSI. For instance, the UE 120 may configure gain and/or amplification factors based at least in part on the maximum RSSI. Using a maximum measurement metric to control the AGC outer feedback loop 614 and/or a gain configuration applied to the LNA 602, may allow the receiver to accommodate a peak received signal power (e.g., a peak DL signal power received by the UE 120) without saturating the LNA 602. Periodic updates based at least in part on the SSB periodicity may alternatively or additionally provide smaller incremental updates (e.g., slow updates) that track signal changes (e.g., received power level changes) over a time span. Alternatively, or additionally, and using the maximum RSSI, a digital scaling configuration for the DVGA 610 may be based at least in part on optimizing a signal set point at a receive Fast Fourier Transform (RxFFT) input, and selection of the signal set point configuration may be performed once per periodicity (e.g., the SSB periodicity). "Optimizing a signal set point" may denote selecting a reference and/or target value for an amplitude or gain that provides the highest gain without distortion and/or saturation of the signal within a receiver chain, such as at the input of an RxFFT.

A same receiver chain may be used to cover SBFD transmissions and non-SBFD transmission. Setting the AGC feedback loop(s) in the receiver chain without considering the different types of transmissions being received may result in saturation at the LNA 602 and/or distortion in receiver stages after the DVGA 610. To illustrate, inter-UE CLI that occurs based at least in part on an SBFD transmission (e.g., an UL transmission in a same OFDM symbol as a DL transmission) may result in the receiver observing strong interference (e.g., interference with a power level that satisfies a strong threshold) from nearby UEs during DL reception. Without considering reception of SBFD transmissions and/or inter-UE CLI, a WCD (e.g., a UE 120) may configure the AGC feedback loop(s) using the above algorithm that is based at least in part on using non-SBFD measurement metrics (e.g., SSB RSSI and/or PDSCH RSSI). However, in using same receiver, the WCD may receive an SBFD transmission using a receiver that includes AGC feedback loop(s) that are configured using non-SBFD measurement metrics that may not accommodate inter-UE CLI that has a higher received power level. Accordingly, inter-UE CLI that has a power level that is higher than the maximum of the SSB RSSI and/or the PDSCH RSSI may result in the LNA 602 potentially being saturated and/or an output of the DVGA 610 causing saturation in digital components that occur after the DVGA 610. That is, the receiver may receive the inter-UE CLI using AGC feedback loop(s) that are configured using non-SBFD measurement metrics that indicate lower power levels than the inter-UE CLI, resulting in distorted signals and/or recovery errors.

Some techniques and apparatuses described herein provide AGC for SBFD transmissions. In some aspects, a network node (e.g., a network node 110) may receive AGC headroom capability that is supported by a first UE (e.g., a first UE 120), and the AGC headroom capability may be based at least in part on a receiver at the first UE. Based at least in part on receiving the AGC headroom capability, the network node may adjust a transmission power level for a UL transmission from a second UE (e.g., a second UE 120) that is transmitted in a same OFDM symbol as a DL transmission to the first UE. By adjusting the transmission power level of the UL transmission from the second UE, the network node may reduce an amount of inter-UE CLI observed by the first UE in the DL transmission, and mitigate hardware saturation at the first UE.

Alternatively, or additionally, a first UE (e.g., a first UE 120) may transmit an AGC headroom capability that is supported by the first UE, such as by transmitting the AGC headroom capability to a network node (e.g., a network node 110). In some aspects, a DL transmission from the network node may be based at least in part on the AGC headroom capability. For instance, the DL transmission may include less inter-CLI interference from a second UE (e.g., a second UE 120) in a same OFDM symbol as the DL transmission based at least in part on the network node using the AGC headroom capability to reduce a power level of an UL transmission by the second UE, resulting in the mitigation of hardware saturation at the first UE.

Alternatively, or additionally, in some aspects, a UE (e.g., a UE 120) may transmit a first indication of an AGC offset capability that is supported by the UE, and the AGC offset capability may be based at least in part on hardware at the UE. The UE may receive a second indication of an AGC offset that is directed to the UE. In some aspects, a network node may transmit the second indication of the AGC offset, and the network node may calculate a value for the AGC offset based at least in part on calculating expected inter-UE CLI interference. The UE may use the AGC offset to configure one or more AGC feedback loops, such as an outer AGC feedback loop and/or an inner AGC feedback loop, to mitigate hardware saturation at the UE.

Alternatively, or additionally, in some aspects, a UE (e.g., a UE 120) may calculate one or more measurement metrics based at least in part on one or more received signals that are associated with SBFD operation. To illustrate, the UE may calculate any combination of an SBFD PDSCH RSSI, a non-SBFD PDSCH RSSI, and/or an SSB RSSI. The UE may update one or more AGC feedback loops based at least in part on the one or more measurement metrics. As one non-limiting example, the UE may select a maximum from the one or more measurement metrics that evaluate an SBFD transmission and/or a non-SBFD transmission (e.g., the SBFD PDSCH RSSI, the non-SBFD PDSCH RSSI, and/or the SSB RSSI), and configure the AGC feedback loops based at least in part on the maximum to mitigate hardware saturation at the UE.

Alternatively, or additionally, a network node (e.g., a network node 110) may calculate one or more CLI metrics that are based at least in part on a first UE (e.g., a first UE 120) and a second UE (e.g., a second UE 120). In some aspects, the network node may receive an AGC headroom capability that is supported by the first UE or the second UE, and analyze the CLI metric(s) to identify whether the AGC headroom capability is satisfied. The network node may schedule at least one of the first UE or the second UE based at least in part on the one or more CLI metrics satisfying and/or failing to satisfy the AGC headroom capability, and the scheduling may be directed at reducing inter-UE CLI and/or to mitigating hardware saturation at the first UE and/or the second UE.

As one example, the network node may apply an DL/UL scheduling condition that reduces and/or disallows the co-scheduling of DL and UL in a same slot for one or more specific operating conditions and/or scenarios. As one example, based at least in part on the calculated CLI metric(s) (e.g., by the network node), the network node may allow the co-scheduling of DL and UL in a same slot based at least in part on both an UL transmission and a DL transmission being within a reported headroom capability. Alternatively, or additionally, the network node may disallow and/or reduce a number of times DL and UL are co-scheduled, such as by enabling uplink-only as described below with regard to FIG. 9D, based at least in part on the UL transmission and/or the DL transmission not being within the reported headroom capability.

Configuring one or more AGC feedback loop(s) based at least in part on inter-UE CLI (examples of which are provided above and below) may mitigate hardware saturation at a UE and/or satisfy one or more SQNR conditions at the UE. Mitigating hardware saturation and/or satisfying the SQNR condition(s) may mitigate distorted signals and/or reduce recovery errors.

As indicated above, FIG. 6 is provided as an example. Other examples may differ from what is described with regard to FIG. 6.

Figure 7:
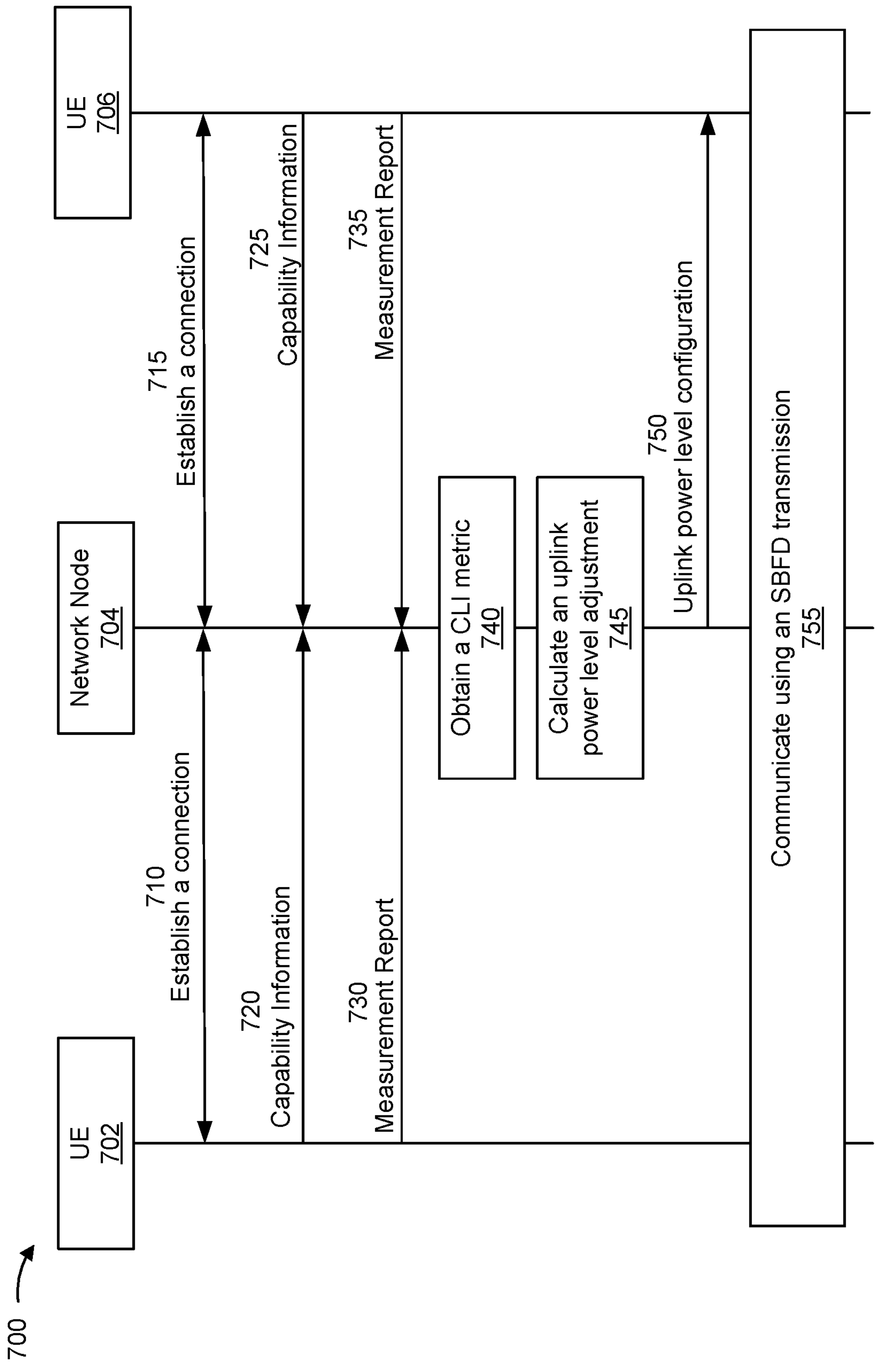
FIG. 7 is a diagram illustrating an example of a wireless communication process between a first UE, a network node, and a second UE, in accordance with the present disclosure.

FIG. 7 is a diagram illustrating an example 700 of a wireless communication process between a first UE 702 (e.g., a first UE 120), a network node 704 (e.g., a network node 110), and a second UE 706 (e.g., a second UE 120), in accordance with the present disclosure.

As shown by reference number 710, a first UE 702 and a network node 704 may establish a first connection that may include any combination of an uplink, a downlink, a control channel and/or a shared channel. Alternatively, or additionally, as shown by reference number 715, the network node 704 may establish a second connection with a second UE 706 that may include any combination of an uplink, a downlink, a control channel and/or a shared channel. To illustrate, the first UE 702 and/or the second UE 706 may power up in a cell coverage area provided by the network node 704, and the first UE 702 and/or the second UE 706 may perform one or more procedures (e.g., a random access channel (RACH) procedure and/or an RRC procedure) with the network node 704 to establish respective wireless connections. As another example, the first UE 702 and/or the second UE 706 may move into the cell coverage area provided by the network node 704 and may perform a handover from a source network node (e.g., another network node 110) to the network node 704. Alternatively, or additionally, the network node 704 and the first UE 702 and/or the second UE 706 may communicate via the respective connection based at least in part on any combination of Layer 1 signaling (e.g., downlink control information (DCI) and/or uplink control information (UCI)), Layer 2 signaling (e.g., a MAC control element (CE)), and/or Layer 3 signaling (e.g., RRC signaling). To illustrate, the network node 704 may request, via RRC signaling, UE capability information and/or the first UE 702 and/or the second UE 706 may transmit, via RRC signaling, the UE capability information. As part of communicating via the connection, the network node 704 may transmit configuration information via Layer 3 signaling (e.g., RRC signaling), and activate and/or deactivate a particular configuration via Layer 2 signaling (e.g., a MAC CE) and/or Layer 1 signaling (e.g., DCI). To illustrate, the network node 704 may transmit the configuration information via Layer 3 signaling at a first point in time associated with the first UE 702 and/or the second UE 706 being tolerant of communication delays, and the network node 704 may transmit an activation of the configuration via Layer 2 signaling and/or Layer 1 signaling at a second point in time associated with the first UE 702 and/or the second UE 706 being intolerant to communication delays.

As shown by reference number 720, the first UE 702 may transmit, and the network node 704 may receive, first capability information. Alternatively, or additionally, as shown by reference number 725, the second UE 706 may transmit, and the network node 704 may receive, second capability information. For clarity, FIG. 7 shows the first UE 702 and the second UE 706 transmitting the capability information separately from establishing a respective connection with the network node 704, but in other examples, the first UE 702 and/or the second UE 706 may transmit the capability information as part of a procedure that is used to establish the respective connection.

In some aspects, the capability information (e.g., the first capability information and/or the second capability information) may indicate an AGC headroom capability that is supported by the UE (e.g., the first UE 702 and/or the second UE 706). For example, the AGC headroom capability may indicate a LNA capability, such as an LNA headroom capability and/or multiple LNA headroom capabilities. In some aspects, the UE may indicate a single LNA headroom capability that implicitly indicates the single LNA headroom capability is applicable to all MCS configurations that are supported by the UE. Alternatively, or additionally, the UE may indicate multiple LNA headroom capabilities, and each LNA headroom capability may be applicable to a respective MCS, a sub-group of MCSs, and/or an MCS group. "Sub-group of MCSs" and/or "MCS group" may denote a sub-grouping of MCSs out of all the MCSs supported by the UE, such as a first MCS group that includes one or more MCSs that satisfy a low MCS threshold, a second MCS group that includes one or more MCSs that satisfy a middle MCS threshold, and/or a third MCS group that includes one or more MCSs that satisfy a high MCS threshold. Accordingly, the UE may include different LNA headroom capabilities for different MCSs. However, in other examples, the UE may not indicate an LNA headroom capability.

As shown by reference number 730, the first UE 702 may transmit, and the network node 704 may receive, a first measurement report. Alternatively, or additionally, as shown by reference number 735, the second UE 706 may transmit, and the network node 704 may receive, a second measurement report. To illustrate, the UE (e.g., the first UE 702 and/or the second UE 706) may calculate one or more measurement metrics, such as an inter-UE CLI metric and/or an RSRP metric, and indicate the measurement metric(s) in the measurement report. In some aspects, the network node 704 may indicate a configuration for a measurement resource and/or a measurement configuration to the UE, and the UE may use the measurement resource configuration and/or the measurement configuration for calculating the measurement metric(s). Alternatively, or additionally, a communication standard may specify one or more configuration parameters of the measurement resource and/or the measurement configuration.

As shown by reference number 740, the network node 704 may obtain a CLI metric. As one example, the network node 704 may calculate a CLI RSSI metric that measures CLI RSSI. As another example, the network node 704 may receive a CLI metric from a UE (e.g., the first UE 702 and/or the second UE 706), such as in a measurement report.

As shown by reference number 745, the network node 704 may calculate an uplink power level adjustment for an uplink transmission by the second UE 706. For instance, the network node 704 may schedule an SBFD transmission that includes an uplink transmission by the second UE 706 in a same OFDM symbol as a downlink transmission to the first UE 702. In some aspects, the uplink power level adjustment may be an adjustment to the uplink power level for the uplink transmission based at least in part on headroom available in a receive path at the first UE 702. That is, the network node 704 may calculate a uplink power level adjustment for the uplink transmission to reduce a power level of inter-UE CLI and/or to mitigate hardware saturation at the first UE 702. Accordingly, the network node 704 may calculate the uplink power level adjustment based at least in part on the LNA headroom capability reporting from the UE (e.g., the first UE 702 and/or a receiving UE). Alternatively, or additionally, the network node 704 may calculate the uplink power level adjustment based at least in part on the measurement metric(s) described above (e.g., the CLI RSSI metric, the RSRP metric, and/or the inter-UE CLI metric). Accordingly, and based at least in part on the measurement metric(s) and/or the LNA headroom capability, the network node 704 may calculate an adjustment value for a transmit power level of the uplink transmission from the second UE 706 based at least in part on keeping a total receive power level at the first UE 702 within a dynamic range of a receiver at the first UE 702. The network node 704 may calculate an adjustment value for the transmission power level of the uplink transmission by the second UE 706 based at least in part on any combination of measurement metric(s) from the first UE 702 and/or an AGC headroom capability of the first UE 702.

As shown by reference number 750, the network node 704 may transmit, and the second UE 706 may receive, an indication of an uplink power level configuration. For example, the network node 704 may transmit an indication of the adjustment value calculated as described with regard to reference number 740. Alternatively, or additionally, the network node 704 may transmit an indication of uplink scheduling that is assigned to the second UE 706, and the uplink scheduling may specify the adjustment value and/or a transmit power level for the uplink transmission by the second UE 706 that is based at least in part on the adjustment level. Accordingly, the network node 704 may adjust a transmission power level for an uplink transmission from the second UE 706 that is transmitted in a same OFDM symbol as a downlink transmission to the first UE 702 to mitigate inter-UE CLI observed by the first UE 702 and/or to mitigate saturation of hardware at the first UE 702.

As shown by reference number 755, the network node 704 may communicate with the first UE 702 and the second UE 706 using an SBFD transmission. For instance, an OFDM symbol of the SBFD transmission may include at least a portion of an uplink transmission by the second UE 706 and/or at least a portion of a downlink transmission to the first UE 702. In some aspects, the SBFD transmission (e.g., the uplink transmission and/or the downlink transmission) may be based at least in part on the AGC headroom capability of the first UE 702, such as by the uplink transmission being based at least in part on a transmit power level that was selected using the AGC headroom capability of the first UE 702 as described above. Alternatively, or additionally, the first UE 702 may process the downlink transmission from the network node 704 in the OFDM symbol using the receiver hardware.

In some aspects, and as part of communicating, the network node 704 may schedule the first UE 702 and/or the second UE 706. In some aspects, the scheduling may be based at least in part on a CLI metric calculated by the first UE 702 and/or the second UE 706. As another example, the scheduling may be based at least in part on a CLI metric calculated by the network node 704. As one example of scheduling, the network node may apply an DL/UL scheduling condition that reduces and/or disallows the co-scheduling of DL and UL in a same slot for one or more specific operating conditions and/or scenarios. As one example, based at least in part on the calculated CLI metric(s) (e.g., by the network node), the network node may allow the co-scheduling of DL and UL in a same slot based at least in part on both an UL transmission and a DL transmission being within a reported headroom capability. Alternatively, or additionally, the network node may disallow and/or reduce a number of times DL and UL are co-scheduled, such as by enabling uplink-only as described below with regard to FIG. 9D, based at least in part on the UL transmission and/or the DL transmission not being within the reported headroom capability.

By reporting AGC headroom capability, a UE may enable a network node to select transmission configurations (e.g., a transmit power level) that may ensure a hardware dynamic range of receiver hardware at the UE is not exceeded. That is, the UE indicating the AGC headroom capability may enable the network node to ensure that a potential SQNR condition (e.g., an SQNR cap) is not exceeded based at least in part on a presence of CLI (e.g., inter-UE CLI) that has a stronger power level than a non-SBFD transmission. Preventing hardware saturation and/or satisfying the SQNR condition(s) may mitigate distorted signals and/or reduce recovery errors.

As indicated above, FIG. 7 is provided as an example. Other examples may differ from what is described with regard to FIG. 7.

Figure 8:
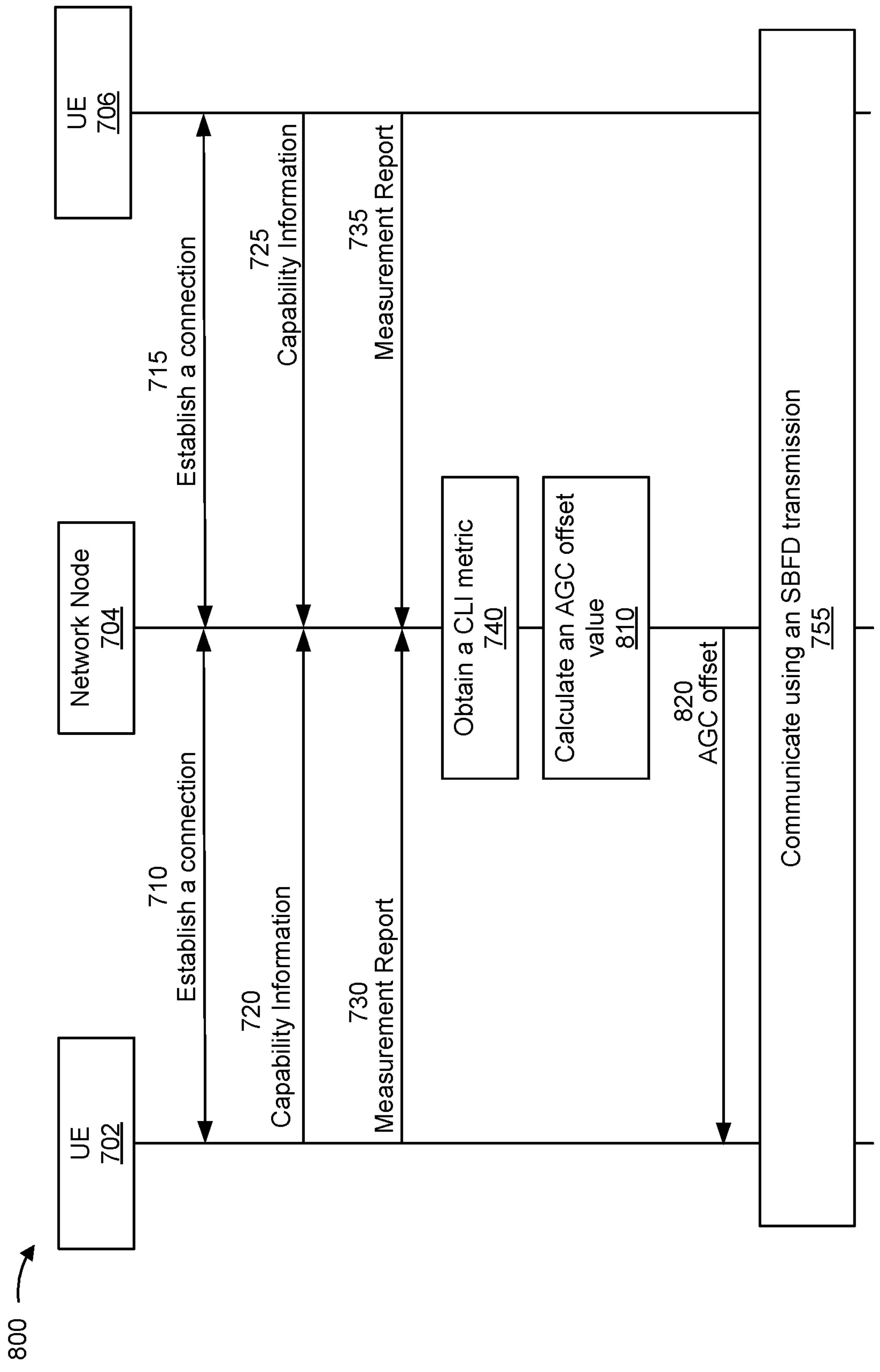
FIG. 8 is a diagram illustrating an example of a wireless communication process between the first UE, the network node, and the second UE as described with regard to FIG. 7, in accordance with the present disclosure.

FIG. 8 is a diagram illustrating an example 800 of a wireless communication process between the first UE 702, the network node 704, and the second UE 706 as described with regard to FIG. 7, in accordance with the present disclosure. Various aspects of the wireless communication process described with regard to FIG. 8 may be used in combination with various aspects of the wireless communication process described with regard to FIG. 7.

As shown by reference number 710, and as described with regard to FIG. 7, the first UE 702 and the network node 704 may establish a first connection that may include any combination of an uplink, a downlink, a control channel and/or a shared channel. Alternatively, or additionally, as shown by reference number 715, the network node 704 may establish a second connection with the second UE 706 any combination of an uplink, a downlink, a control channel and/or a shared channel as described with regard to FIG. 7.

As shown by reference number 720, the first UE 702 may transmit, and the network node 704 may receive, first capability information as described with regard to FIG. 7. Alternatively, or additionally, as shown by reference number 725, the second UE 706 may transmit, and the network node 704 may receive, second capability information as described with regard to FIG. 7.

In some aspects, the first UE 702 and/or the second UE 706 may indicate, via the respective capability information, an AGC offset capability. That is, the first UE 702 and/or the second UE 706 may indicate support for using an AGC offset to configure one or more AGC feedback loops. Alternatively, or additionally, the network node 704 may transmit an indication of a network node AGC offset capability (e.g., that the network node 704 includes support for configuring an AGC offset at a UE). As one example, the network node 704 may broadcast an indication of the network node AGC offset capability prior to establishing the first connection and/or the second connection (e.g., in a system information block (SIB)). In some aspects, the first UE 702 and/or the second UE 706 may make a selection to connect with the network node 704 based at least in part on receiving the indication of the network node AGC offset capability.

As shown by reference number 730, the first UE 702 may transmit, and the network node 704 may receive, a first measurement report as described with regard to FIG. 7. Alternatively, or additionally, as shown by reference number 735, the second UE 706 may transmit, and the network node 704 may receive, a second measurement report as described with regard to FIG. 7. For instance, the first UE 702 and/or the second UE 706 may calculate an inter-UE CLI metric and/or an RSRP metric, and report the inter-UE CLI metric and/or the RSRP metric to the network node 704.

As shown by reference number 740, the network node 704 may obtain a CLI metric. As one example, the network node 704 may calculate a CLI RSSI metric and/or receive the CLI metric from a UE as described with regard to FIG. 7.

As shown by reference number 810, the network node 704 may calculate an AGC offset. In some aspects, the AGC offset may be a signal level adjustment that a receiving device may use to adjust an amplitude and/or level of a received signal to mitigate hardware saturation. Alternatively, or additionally, the AGC offset may be used to set a desired reference level from an AGC feedback loop to mitigate hardware saturation. As one example, the network node 704 may calculate an AGC offset for a receiving UE (e.g., the first UE 702) based at least in part on an inter-UE CLI metric from the receiving UE, the RSRP metric from the receiving, and/or the AGC offset capability indicated by the receiving UE. To illustrate, the network node 704 may calculate the AGC offset for the first UE 702 based at least in part on scheduling a downlink transmission for the first UE (e.g., an SBFD transmission and/or a non-SBFD transmission). Alternatively, or additionally, the network node 704 may calculate the AGC offset using the CLI metric calculated by the network node 704 as described with regard to reference number 740. In some aspects, the network node 704 may calculate a value for the AGC offset using a measurement metric that indicates a highest power level out of multiple measurement metric. Alternatively, or additionally, the network node 704 may calculate, as the AGC offset, a value configured to mitigate hardware saturation at a particular receiving UE. That is, the network node 704 may calculate a UE-specific value for the AGC offset (e.g., a UE-specific AGC offset) for a particular UE and/or capabilities of the particular UE.

As shown by reference number 820, the network node 704 may transmit, and the first UE 702 may receive, an indication of an AGC offset. To illustrate, the network node 704 may transmit the indication of the AGC offset using any combination of Layer 1 signaling (e.g., dynamically), Layer 2 signaling, and/or Layer 3 signaling (e.g., semi-statically using the Layer 2 signaling and/or the Layer 3 signaling).

While FIG. 8 illustrates the network node 704 transmitting an indication of an AGC offset, other examples may not include the network node 704 explicitly indicating an AGC offset (e.g., the network node 704 may not transmit an indication of the AGC offset). Accordingly, and based at least in part on the network node 704 not explicitly providing and/or indicating the AGC offset, the first UE 702 may calculate the AGC offset based at least in part on an AGC headroom at the first UE 702. To illustrate, the first UE 702 may receive one or more signals, and calculate, using the signal(s), any combination of an SBFD PDSCH RSSI, a non-SBFD PDSCH RSSI, a non-SBFD SSB RSSI, and/or an AGC headroom. In some aspects, the first UE 702 may calculate the AGC offset and/or configure one or more AGC feedback loop(s) using the SBFD PDSCH RSSI, the non-SBFD PDSCH RSSI, the non-SBFD SSB RSSI, and/or the AGC headroom. To illustrate, the first UE 702 may derive the AGC offset and/or configure the AGC feedback loop(s) based at least in part on selecting a maximum from the non-SBFD SSB RSSI, the non-SBFD PDSCH RSSI combined with the AGC headroom, and the SBFD PDSCH RSSI. Accordingly, the AGC headroom imply the AGC offset and/or may be used by the first UE 702 to derive and/or obtain the AGC offset.

As shown by reference number 755, the first UE 702, the network node 704, and/or the second UE 706 may communicate via an SBFD transmission as described with regard to FIG. 7. In some aspects, the first UE 702 may receive a downlink transmission that is part of the SBFD transmission, while in other aspects, the first UE 702 may receive a non-SBFD transmission. The first UE 702 may communicate with the network node 704 by processing a downlink transmission (e.g., either the SBFD transmission and/or the non-SBFD transmission) from the network node 704. In some aspects, the first UE 702 may not use an AGC offset to process the downlink transmission, such as in scenarios that an AGC offset capability is disabled at the first UE 702. However, in other aspects, the first UE 702 may process the downlink transmission using the AGC offset, such as in scenarios that the AGC offset capability is enabled.

As one example, the first UE 702 may apply the AGC offset (e.g., received from the network node 704 and/or calculated by the first UE 702 as described with regard to reference number 820 to one or more AGC feedback loops). That is, the first UE 702 may configure the AGC feedback loop(s) using the AGC offset, such as by using the AGC offset to configure a reference signal for an outer LNA feedback loop (e.g., the AGC outer feedback loop 614) and/or for an inner DVGA feedback loop (e.g., the AGC inner feedback loop 616). Accordingly, and based at least in part on applying the AGC offset to the AGC feedback loops (e.g., configuring the AGC feedback loops using the AGC offset), the first UE 702 may process a downlink transmission received from the network node 704. In some aspects, the first UE 702 may process a non-SBFD transmission using a receiver path that is not configured with the AGC offset (e.g., the AGC feedback loop(s)). Alternatively, or additionally, the first UE 702 may process an SBFD transmission using the same receiver path that is configured with the AGC offset.

By indicating support for an AGC offset, a UE may enable a network node to select an AGC offset that may ensure a hardware dynamic range of the UE is not exceeded in the presence of inter-UE CLI that has a higher power level relative to a non-SBFD transmission. That is, the UE supporting an AGC offset may mitigate hardware saturation, mitigate distorted signals, and/or reduce recovery errors.

As indicated above, FIG. 8 is provided as an example. Other examples may differ from what is described with regard to FIG. 8.

Figure 9A:
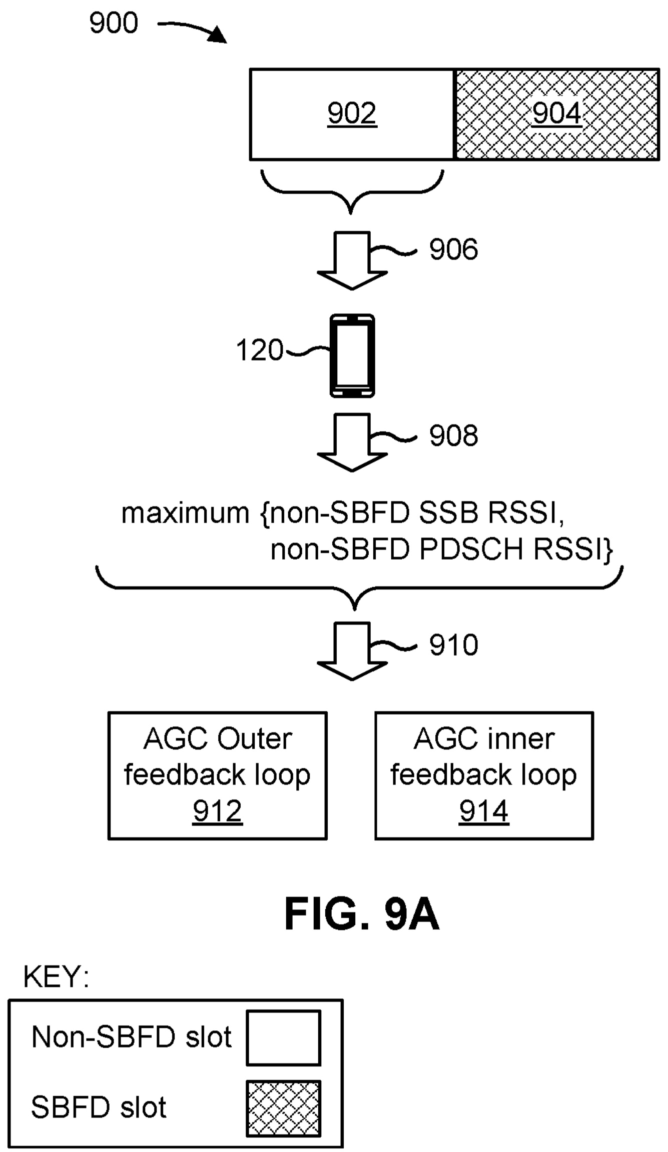
FIGS. 9A and 9B are diagrams illustrating a first example and a second example, respectively, of autonomous UE adaptation of one or more automatic gain control (AGC) feedback loops, in accordance with the present disclosure.
Figure 9B:
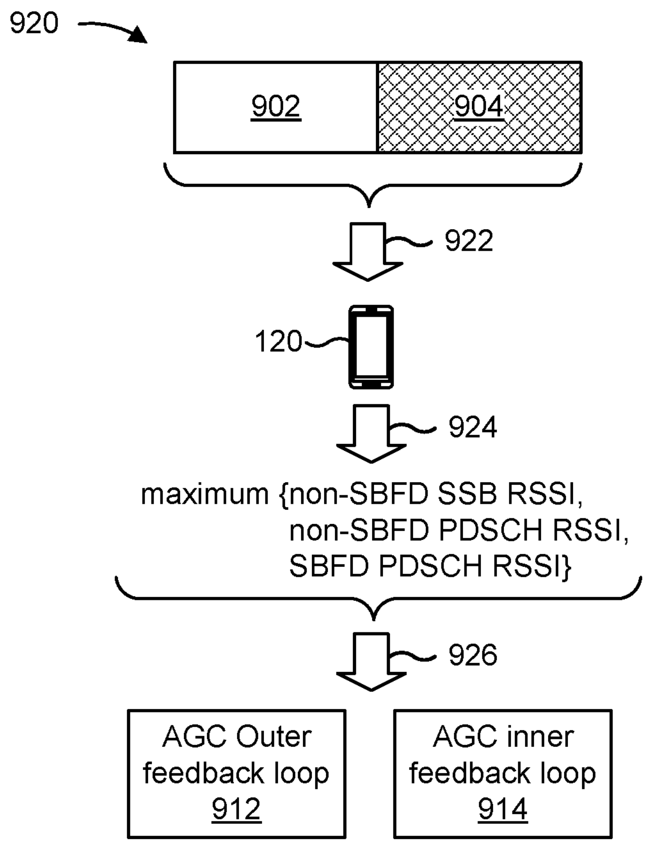

FIGS. 9A and 9B are diagrams illustrating a first example 900 and a second example 920, respectively, of autonomous UE adaptation of one or more AGC feedback loops, in accordance with the present disclosure. Although a UE may autonomously adapt an AGC feedback loop using the various aspects described with regard to FIGS. 9A and 9B, other examples may include the UE adapting an AGC feedback loop as described with regard to FIGS. 9A and 9B in combination with using various aspects described with regard to the wireless communication process described with regard to FIG. 7 and/or the wireless communication process described with regard to FIG. 8.

In some aspects, a UE (e.g., a UE 120) may configure an AGC feedback loop based at least in part on one or more measurement metrics. FIG. 9A illustrates a first example 900 that includes a non-SBFD slot 902 (shown in solid white) and an SBFD slot 904 (shown with a cross-line pattern), and the UE 120 may receive one or more signals via the non-SBFD slot 902 and/or the SBFD slot 904. While FIG. 9A shows a single non-SBFD slot and a single SBFD slot, the UE 120 may receive signals via multiple non-SBFD slots and/or multiple SBFD slots, periodically and/or asynchronously. As shown by reference number 906 and reference number 908, the UE 120 may use signal(s) received in the non-SBFD slot to generate one or more measurement metrics. For example, the UE 120 may calculate a non-SBFD SSB RSSI metric using a first signal received in a first instance of the non-SBFD slot 902 and/or a non-SBFD PDSCH RSSI metric using a second signal received via a second instance of the non-SBFD slot 902. Alternatively, or additionally, the UE 120 may calculate both metrics using a same signal. As described above, the UE 120 may generate the non-SBFD SSB RSSI metric and/or the non-SBFD PDSCH RSSI metric periodically and/or iteratively every SSB period. As shown by reference number 910, the UE 120 may configure and/or update an AGC outer feedback loop 912 (e.g., the AGC outer feedback loop 614 as described with regard to FIG. 6) and/or an AGC inner feedback loop 914 (e.g., the AGC inner feedback loop 616 as described with regard to FIG. 6) based at least in part on a maximum of the measurement metrics (shown by FIG. 9A as a maximum of the non-SBFD SSB RSSI metric and the non-SBFD PDSCH RSSI metric). That is, the UE 120 may configure the AGC feedback loop(s) using measurement metric(s) that are based at least in part on the non-SBFD slot 902 and/or may not configure the AGC feedback loop(s) using a measurement metric that is based at least in part on the SBFD slot 904. In some aspects, the UE 120 may update the AGC feedback loops(s) once per SSB period. Without analyzing inter-UE CLI associated with the SBFD slot 904, the UE 120 may observe inter-UE CLI that has a power level that is higher than the maximum of the non-SBFD SSB RSSI and/or the non-SBFD PDSCH RSSI, resulting in hardware saturation at the UE 120.

In the second example 920 shown by FIG. 9B, the UE 120 may autonomously configure an AGC feedback loop based at least in part on the non-SBFD slot 902 and the SBFD slot 904. For example, and as shown by reference number 922 and reference number 924, the UE 120 may calculate a non-SBFD SSB RSSI metric using a first signal received in a first instance of the non-SBFD slot 902, a non-SBFD PDSCH RSSI metric using a second signal received in a second instance of the non-SBFD slot 902, and/or an SBFD PDSCH RSSI metric using a third signal received in first instance of the SBFD slot 904. Alternatively, or additionally, the UE 120 may calculate the non-SBFD metrics using a same signal.

As shown by reference number 926, the UE 120 may configure and/or update the AGC outer feedback loop 912 and/or the AGC inner feedback loop 914 (based at least in part on a maximum of the measurement metrics) (shown by FIG. 9B as a maximum of the non-SBFD SSB RSSI metric, the non-SBFD PDSCH RSSI metric, and the SBFD PDSCH RSSI metric). In some aspects, the UE 120 may calculate the measurement metrics and/or update the AGC feedback loops(s) once per SSB period. Including a measurement metric that calculated using a signal received in the SBFD slot 904, the UE 120 may configure the AGC feedback loops(s) of a receiver that is used for both non-SBFD transmissions and SBFD transmissions based at least in part on a maximum signal power level of both the non-SBFD transmissions and inter-UE CLI derived from the SBFD transmissions, and mitigate hardware saturation.

As indicated above, FIGS. 9A and 9B are provided as examples. Other examples may differ from what is described with regard to FIGS. 9A, 9B, 9C, and 9D.

Figure 10A:
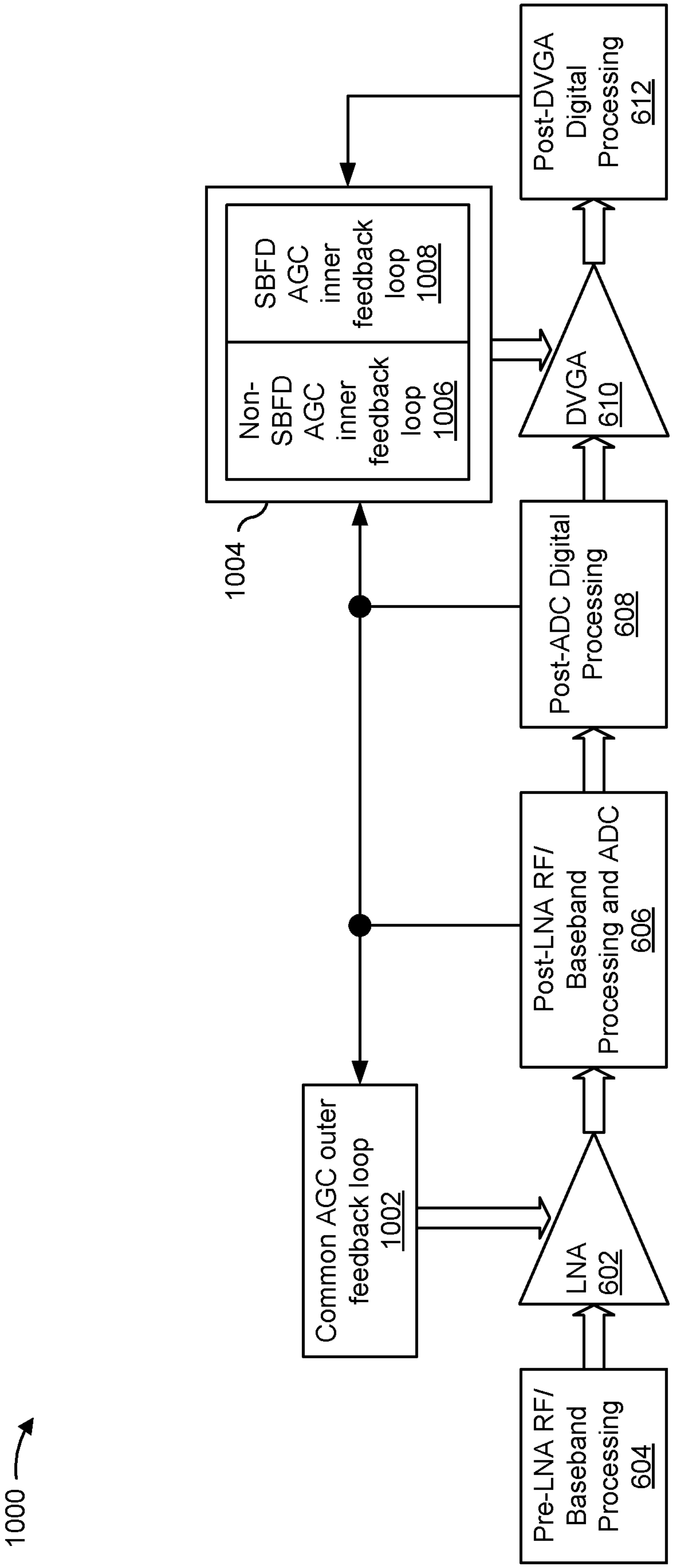
FIGS. 10A and 10B are diagrams illustrating a first example and a second example of configuring one or more AGC feedback loops, in accordance with the present disclosure.
Figure 10B:
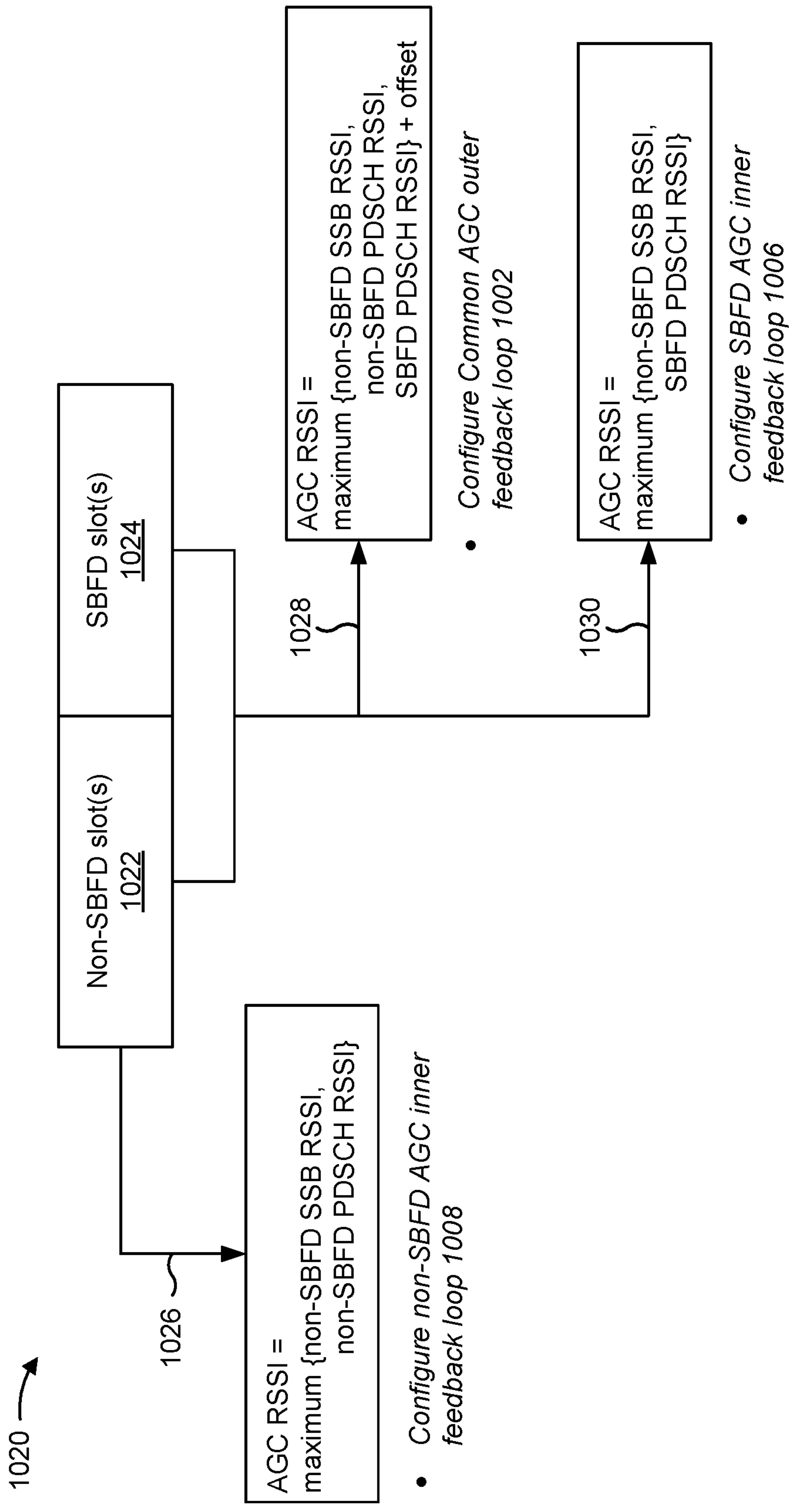

FIGS. 10A and 10B are diagrams illustrating a first example 1000 and a second example 1020 of configuring one or more AGC feedback loops, in accordance with the present disclosure. Various aspects of the first example 1000 and the second example 1020 may be implemented by a WCD (e.g., a UE 120 and/or a network node 110), and may be used autonomously and/or in combination with various aspects described with regard to the wireless communication process described with regard to FIG. 7, the wireless communication process described with regard to FIG. 8, and/or the various aspects described with regard to FIGS. 9A, 9B, 9C, and/or 9D.

The first example 1000 shown by FIG. 10A is block diagram of an example receiver that may be used by a WCD to receive a non-SBFD transmission (e.g., in a non-SBFD slot) and an SBFD transmission (e.g., in an SBFD slot). The first example 1000 includes at least some functionality and/or blocks described with regard to FIG. 6, such as the LNA 602, the pre-LNA processing 604, the post-LNA RF/baseband processing and ADC 606, the post-ADC digital processing 608, the DVGA 610, and the post-DVGA digital processing 612.

As shown by FIG. 10A, the receiver in the first example 1000 includes a common AGC outer feedback loop 1002, and an AGC inner feedback loop 1004 that includes a non-SBFD AGC inner feedback loop 1006 and an SBFD AGC inner feedback loop 1008. The common AGC outer feedback loop 1002 may be used by the receiver for receiving and/or processing a non-SBFD transmission and an SBFD transmission. That is, the common AGC outer feedback loop 1002 may be used to configure the LNA 602 during both a non-SBFD slot and an SBFD slot. The non-SBFD AGC inner feedback loop 1006 may be used by the receiver to receive and/or process a non-SBFD transmission (e.g., by configuring the DVGA 610 during a non-SBFD slot), and the SBFD AGC inner feedback loop 1008 may be used by the receiver to receive and/or process an SBFD transmission (e.g., by configuring the DVGA 610 during an SBFD slot). Accordingly, the WCD and/or the receiver may switch between the different inner feedback loops that are shown by FIG. 10A.

In some aspects, the WCD may configure and/or update one of the AGC feedback loops based at least in part on one or more measurement metrics. To illustrate, FIG. 10B illustrates a second example 1020 of measurement metrics that may be calculated and/or used by the WCD to configure any combination of the common AGC outer feedback loop 1002, the non-SBFD AGC inner feedback loop 1006, and/or the SBFD AGC inner feedback loop 1008 described with regard to FIG. 10A. In a similar manner as described with regard to FIGS. 9A, 9B, 9C, and 9D, the WCD may calculate the measurement metric(s) using signal(s) received in one or more non-SBFD slots 1022 and/or one or more SBFD slots 1024. Alternatively, or additionally, the WCD may calculate the measurement metric(s) every SSB period and/or update the AGC feedback loop(s) on one or more SSB boundaries.

As shown by reference number 1026, the WCD may calculate a non-SBFD SSB RSSI metric and/or a non-SBFD PDSCH RSSI metric using one or more signal(s) received using the non-SBFD slot(s) 1022. The WCD may select, as an AGC RSSI metric, a maximum of the non-SBFD SSB RSSI and/or the non-SBFD PDSCH RSSI, where the AGC RSSI metric is an RSSI metric used to configure an AGC feedback loop. More particularly, the WCD may configure the non-SBFD AGC inner feedback loop 1006 using the AGC RSSI metric described with regard to reference number 1026.

As shown by reference number 1028, the WCD may calculate a non-SBFD SSB RSSI and/or a non-SBFD PDSCH RSSI using one or more signal(s) received using the non-SBFD slot(s) 1022 (e.g., each SSB period). Alternatively, or additionally, the WCD may calculate an SBFD PDSCH RSSI using one or more signal(s) received using the SBFD slots 1024 (e.g., each SSB period). The WCD may select, as an AGC RSSI metric, a maximum of the non-SBFD SSB RSSI, the non-SBFD PDSCH RSSI, and the SBFD PDSCH RSSI. In some aspects, the AGC RSSI metric may be based at least in part on a combination of the maximum RSSI metric and an offset (e.g., an AGC offset as described with regard to FIG. 8). As shown by FIG. 10B, the WCD may configure the common AGC outer feedback loop 1002 described with regard to FIG. 10A using the AGC RSSI metric described with regard to reference number 1028.

As shown by reference number 1030, the WCD may calculate a non-SBFD SSB RSSI metric using one or more signal(s) received using the non-SBFD slot(s) 1022 and/or an SBFD PDSCH RSSI metric using one or more signal(s) received using the SBFD slots 1024 (e.g., each SSB period). The WCD may select, as an AGC RSSI metric, a maximum of the non-SBFD SSB RSSI metric and the SBFD PDSCH RSSI metric. As shown by FIG. 10B, the WCD may configure the SBFD AGC inner feedback loop 1008 described with regard to FIG. 10A using the AGC RSSI metric described with regard to reference number 1030.

As described above, the WCD may calculate one or more of the measurement metrics each SSB period and/or update one or more of the AGC feedback loops at each SSB boundary. In some aspects, the WCD may update one or more of the AGC inner feedback loops (e.g., the non-SBFD AGC inner feedback loop 1006 and/or the SBFD AGC inner feedback loop 1008) on one or more boundaries between an SBFD slot and a non-SBFD slot. That is, the WCD may update the AGC inner feedback loop(s) on the SBFD slot/non-SBFD slot boundary (or vice versa), but not a AGC outer feedback loop (e.g., common AGC outer feedback loop 1002). In some aspects, the DVGA 610 may be updated based at least in part on a particular AGC inner feedback loop, such as by the non-SBFD AGC inner feedback loop 1006 at a first boundary from an SBFD slot to a non-SBFD slot and/or by the SBFD AGC inner feedback loop 1008 at a second boundary from a non-SBFD slot to an SBFD slot.

As indicated above, FIGS. 10A and 10B are provided as examples. Other examples may differ from what is described with regard to FIGS. 10A and 10B.

Figure 11A:
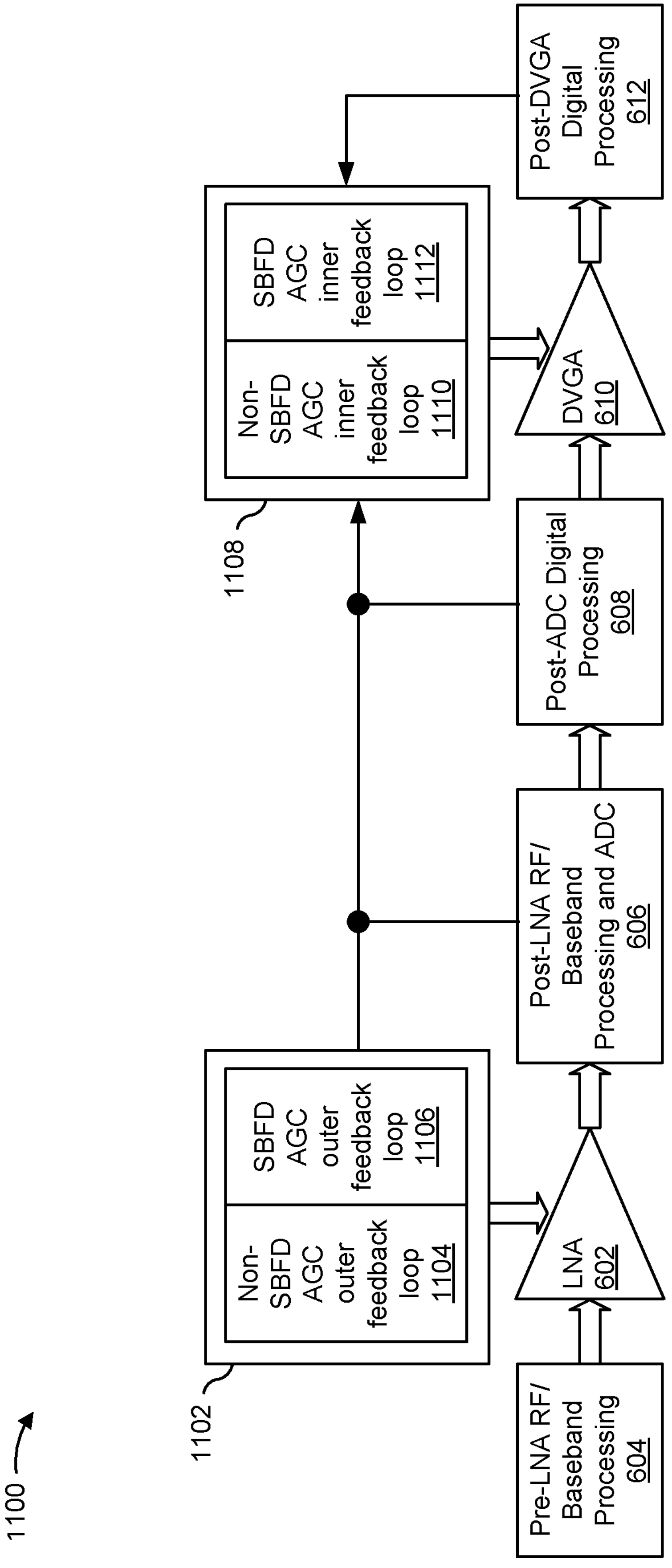
FIGS. 11A and 11B are diagrams illustrating a first example and a second example of configuring one or more AGC feedback loops, in accordance with the present disclosure.
Figure 11B:
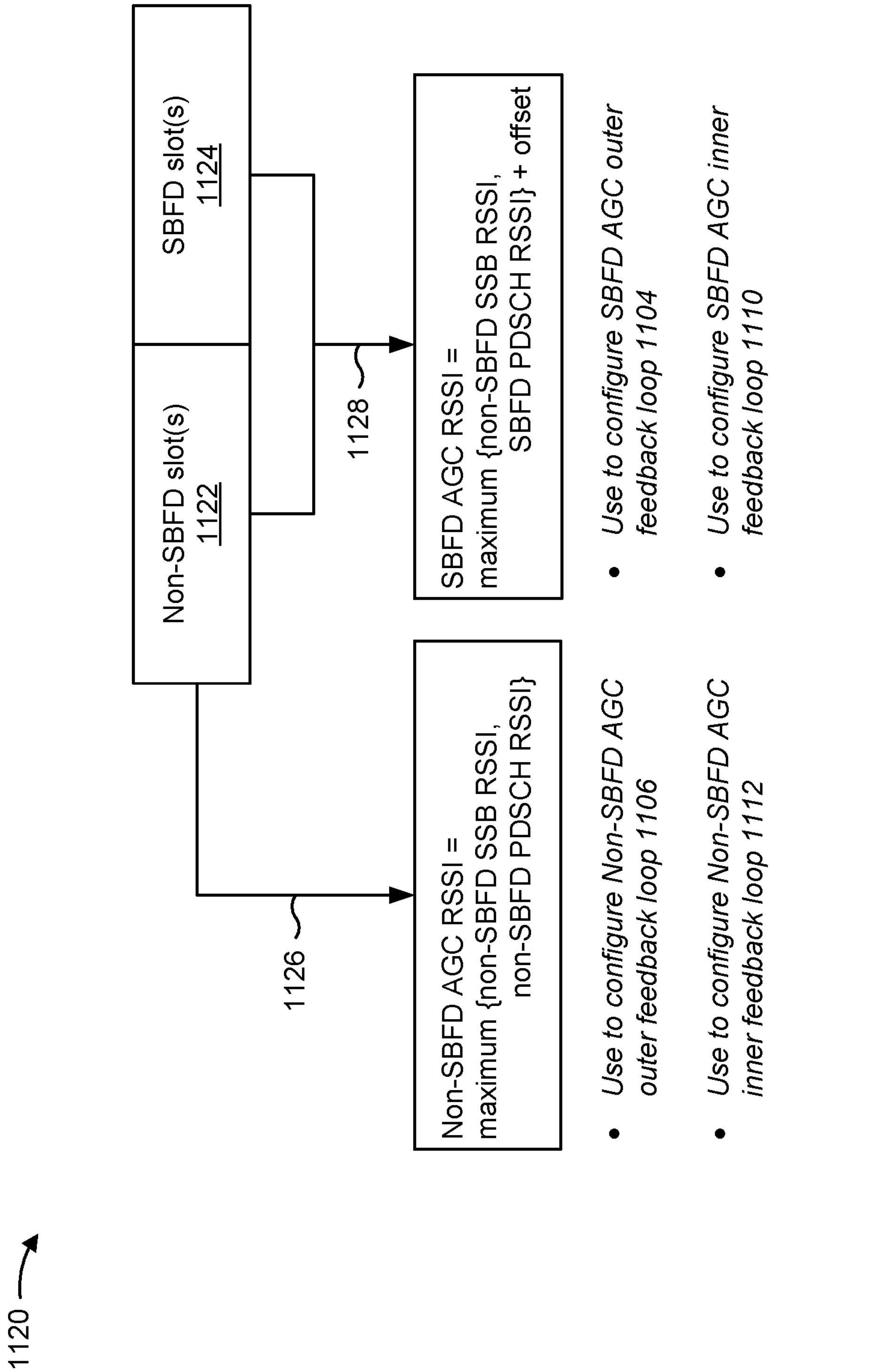

FIGS. 11A and 11B are diagrams illustrating a first example 1100 and a second example 1120 of configuring one or more AGC feedback loops, in accordance with the present disclosure. Various aspects of the first example 1100 and the second example 1120 may be implemented by a WCD (e.g., a UE 120 and/or a network node 110), and may be used autonomously and/or in combination with various aspects described with regard to the wireless communication process described with regard to FIG. 7, the wireless communication process described with regard to FIG. 8, and/or the various aspects described with regard to FIGS. 9A, 9B, 9C, and/or 9D.

The first example 1100 shown by FIG. 11A is block diagram of an example receiver that may be used by a WCD to receive both a non-SBFD transmission (e.g., in a non-SBFD slot) and an SBFD transmission (e.g., in an SBFD slot). The first example 1100 includes at least some functionality and/or blocks described with regard to FIG. 6, such as the LNA 602, the pre-LNA processing 604, the post-LNA RF/baseband processing and ADC 606, the post-ADC digital processing 608, the DVGA 610, and the post-DVGA digital processing 612.

As shown by FIG. 11A, the receiver in the first example 1100 includes an AGC outer feedback loop 1102 that includes a non-SBFD AGC outer feedback loop 1104 and an SBFD AGC outer feedback loop 1106. The non-SBFD AGC outer feedback loop 1104 may be used by the receiver to receive and/or process a non-SBFD transmission, such as by configuring the LNA 602 during a non-SBFD slot. Alternatively, or additionally, the SBFD AGC outer feedback loop 1106 may be used by the receiver to receive and/or process an SBFD transmission, such as by configuring the LNA 602 during an SBFD slot.

The receiver in the first example 1100 also includes an AGC inner feedback loop 1108 that includes a non-SBFD AGC inner feedback loop 1110 and an SBFD AGC inner feedback loop 1112. In a similar manner as described above with regard to FIG. 10A, the non-SBFD AGC inner feedback loop 1110 may be used by the receiver to receive and/or process a non-SBFD transmission (e.g., by configuring the DVGA 610 during a non-SBFD slot), and the SBFD AGC inner feedback loop 1112 may be used by the receiver to receive and/or process an SBFD transmission (e.g., by configuring the DVGA 610 during an SBFD slot). Accordingly, the WCD and/or the receiver may switch between using the different AGC outer feedback loops and/or the AGC feedback loops that are shown by FIG. 11A.

In some aspects, the WCD may configure and/or update one or of the AGC feedback loops based at least in part on one or more measurement metrics. To illustrate, FIG. 11B illustrates a second example 1120 of measurement metrics that may calculated and/or used by the WCD to configure any combination of the non-SBFD AGC outer feedback loop 1104, the SBFD AGC outer feedback loop 1106, the non-SBFD AGC inner feedback loop 1110, and/or the SBFD AGC inner feedback loop 1112 described with regard to FIG. 11A. In a similar manner as described with regard to FIGS. 9A, 9B, 9C, 9D, and FIG. 10B, the WCD may calculate the measurement metric(s) using signal(s) received in one or more instances of a non-SBFD slot 1122 and/or an SBFD slot 1124.

As shown by reference number 1126, the WCD may calculate a non-SBFD SSB RSSI metric and/or a non-SBFD PDSCH RSSI metric using signal(s) received using the non-SBFD slot 1122. The WCD may select, as an AGC RSSI metric (e.g., a non-SBFD AGC RSSI metric), a maximum of the non-SBFD SSB RSSI metric and/or the non-SBFD PDSCH RSSI metric. As shown by FIG. 11B, the WCD may configure the non-SBFD AGC outer feedback loop 1104 and/or the non-SBFD AGC inner feedback loop 1110 using the AGC RSSI metric as described with regard to reference number 1126 (e.g., the non-SBFD AGC RSSI metric).

As shown by reference number 1128, the WCD may calculate a non-SBFD SSB RSSI metric using signal(s) received using the non-SBFD slot 1122. In some aspects, the WCD may iteratively calculate the non-SBFD SSB RSSI metric each SSB period using a respective signal received in a respective non-SBFD slot 122. Alternatively, or additionally, the WCD may calculate an SBFD PDSCH RSSI metric using signal(s) received using the SBFD slot 1124. In a similar manner as described above, the WCD may iteratively calculate the SBFD PDSCH RSSI metric each SSB period using a respective signal received in a respective SBFD slot 1124. The WCD may select, as an AGC RSSI metric (e.g., an SBFD AGC RSSI metric), a maximum of the non-SBFD SSB RSSI and the SBFD PDSCH RSSI. In some aspects, the AGC RSSI metric may be calculated based at least in part on the maximum and an offset (e.g., an AGC offset as described with regard to FIG. 8). As shown by FIG. 11B, the WCD may configure the SBFD AGC outer feedback loop 1106 and/or the SBFD AGC inner feedback loop 1112 described with regard to FIG. 11A using the AGC RSSI metric described with regard to reference number 1128 (e.g., the maximum of the non-SBFD SSB RSSI value and the SBFD AGC RSSI value).

As described above, the WCD may calculate one or more of the measurement metrics each SSB period and/or update the AGC feedback loop(s) (e.g., any combination of the non-SBFD AGC outer feedback loop 1104, the SBFD AGC outer feedback loop 1106, the non-SBFD AGC inner feedback loop 1110, and/or the SBFD AGC inner feedback loop 1112) at each SSB boundary. Alternatively, or additionally, the WCD may update one or more of the AGC feedback loop(s) on one or more boundaries between an SBFD slot and a non-SBFD slot (and/or vice versa). In some aspects, the DVGA 610 may be updated based at least in part on one of the AGC inner feedback loop(s), such as by the non-SBFD AGC inner feedback loop 1110 at a first boundary from an SBFD slot to a non-SBFD slot and/or by the SBFD AGC inner feedback loop 1112 at a second boundary from a non-SBFD slot to an SBFD slot. Alternatively, or additionally, the LNA 602 may be updated based at least in part on one of the AGC outer feedback loop(s), such as by the non-SBFD AGC outer feedback loop 1104 at the first boundary and/or by the SBFD AGC outer feedback loop 1106 at the second boundary. In some aspects, the WCD may update the LNA 602 and/or the AGC outer feedback loop(s) using a hysteresis (e.g., a delay) to reduce LNA switching. Alternatively, or additionally, the AGC feedback loop(s) may be updated based at least in part on a power difference level (e.g., a difference between a first measurement metric that is based at least in part on a signal received in an SBFD slot and a second measurement metric that is based at least in part on a signal received in a non-SBFD slot) satisfying a high difference threshold to mitigate ADC saturation and/or quantization noise.

Configuring one or more AGC feedback loop(s) based at least in part on using metrics for non-SBFD measurement metrics in combination with SBFD measurement metrics may mitigate hardware saturation at a UE and/or enable the UE to satisfy SQNR condition(s). Mitigating hardware saturation and/or satisfying the SQNR condition(s) may mitigate distorted signals and/or reduce recovery errors.

As indicated above, FIGS. 11A and 11B are provided as examples. Other examples may differ from what is described with regard to FIGS. 11A and 11B.

Figure 12:
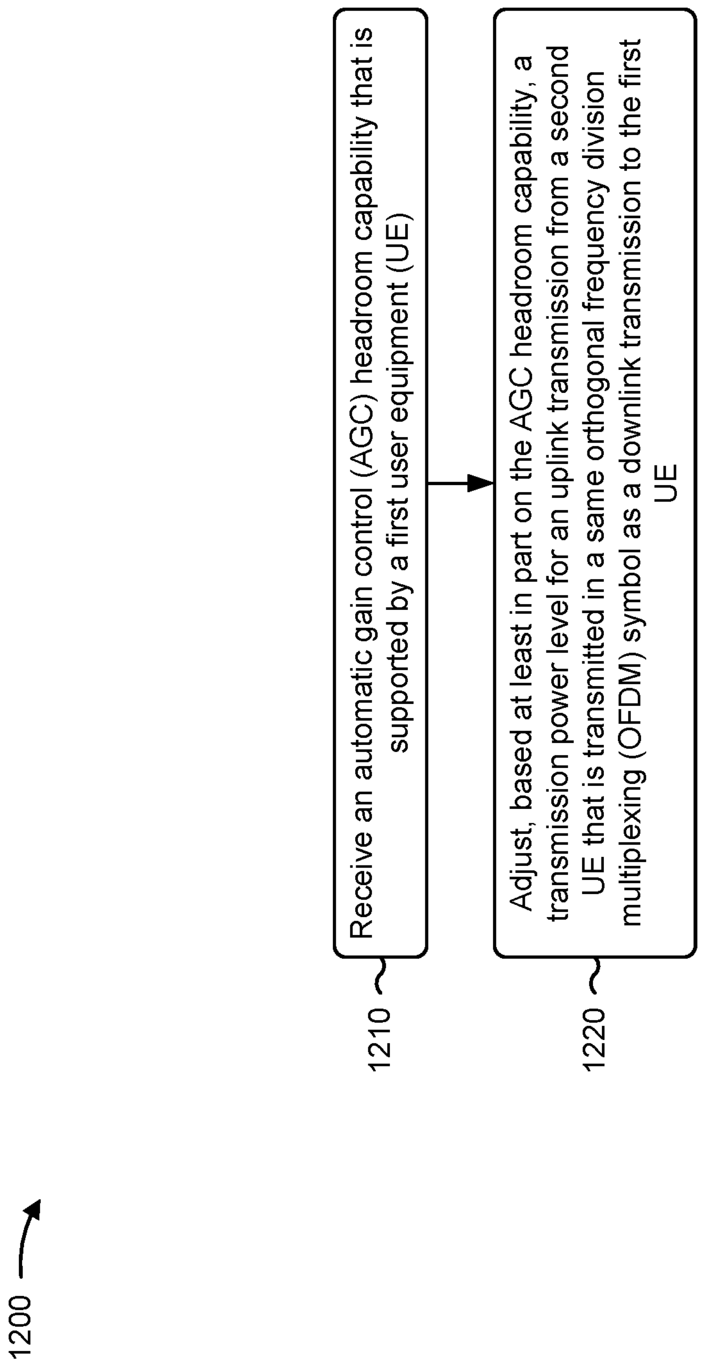
FIG. 12 is a diagram illustrating an example process performed, for example, at a network node or an apparatus of a network node, in accordance with the present disclosure.

FIG. 12 is a diagram illustrating an example process 1200 performed, for example, at a network node or an apparatus of a network node, in accordance with the present disclosure. Example process 1200 is an example where the apparatus or the network node (e.g., network node 110) performs operations associated with AGC for SBFD transmissions.

As shown in FIG. 12, in some aspects, process 1200 may include receiving an AGC headroom capability that is supported by a first UE (block 1210). For example, the network node (e.g., using reception component 1802 and/or communication manager 1806, depicted in FIG. 18) may receive an AGC headroom capability that is supported by a first UE, as described above.

As further shown in FIG. 12, in some aspects, process 1200 may include adjusting, based at least in part on the AGC headroom capability, a transmission power level for an uplink transmission from a second UE that is transmitted in a same OFDM symbol as a downlink transmission to the first UE (block 1220). For example, the network node (e.g., using communication manager 1806, depicted in FIG. 18) may adjust, based at least in part on the AGC headroom capability, a transmission power level for an uplink transmission from a second UE that is transmitted in a same OFDM symbol as a downlink transmission to the first UE, as described above.

Process 1200 may include additional aspects, such as any single aspect or any combination of aspects described below and/or in connection with one or more other processes described elsewhere herein.

In a first aspect, adjusting the transmission power level includes adjusting the transmission power level to mitigate saturation of hardware at the first UE.

In a second aspect, the AGC headroom capability includes a low noise amplifier headroom capability that is applicable to multiple modulation and coding schemes.

In a third aspect, the AGC headroom capability includes multiple LNA headroom capabilities, and each LNA headroom capability of the multiple LNA headroom capabilities is applicable to a respective modulation and coding scheme.

In a fourth aspect, the AGC headroom capability includes multiple LNA headroom capabilities, and each LNA headroom capability of the multiple LNA headroom capabilities is applicable to a respective modulation and coding scheme group.

In a fifth aspect, process 1200 includes receiving one or more measurement metrics from the first UE, and calculating an adjustment value for the transmission power level of the second UE based at least in part on the one or more measurement metrics from the first UE and the AGC headroom capability, and adjusting the transmission power level includes adjusting the transmission power level using the adjustment value.

In a sixth aspect, the one or more measurement metrics from the first UE comprise at least one of an inter-UE CLI metric, or a RSRP metric.

In a seventh aspect, process 1200 includes receiving a UE capability indication from the UE that indicates support for AGC headroom capability reporting.

In an eighth aspect, process 1200 includes obtaining one or more cross-link interference (CLI) metrics that are based at least in part on the first UE and the second UE; and scheduling at least one of the first UE or the second UE using the one or more CLI metrics.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
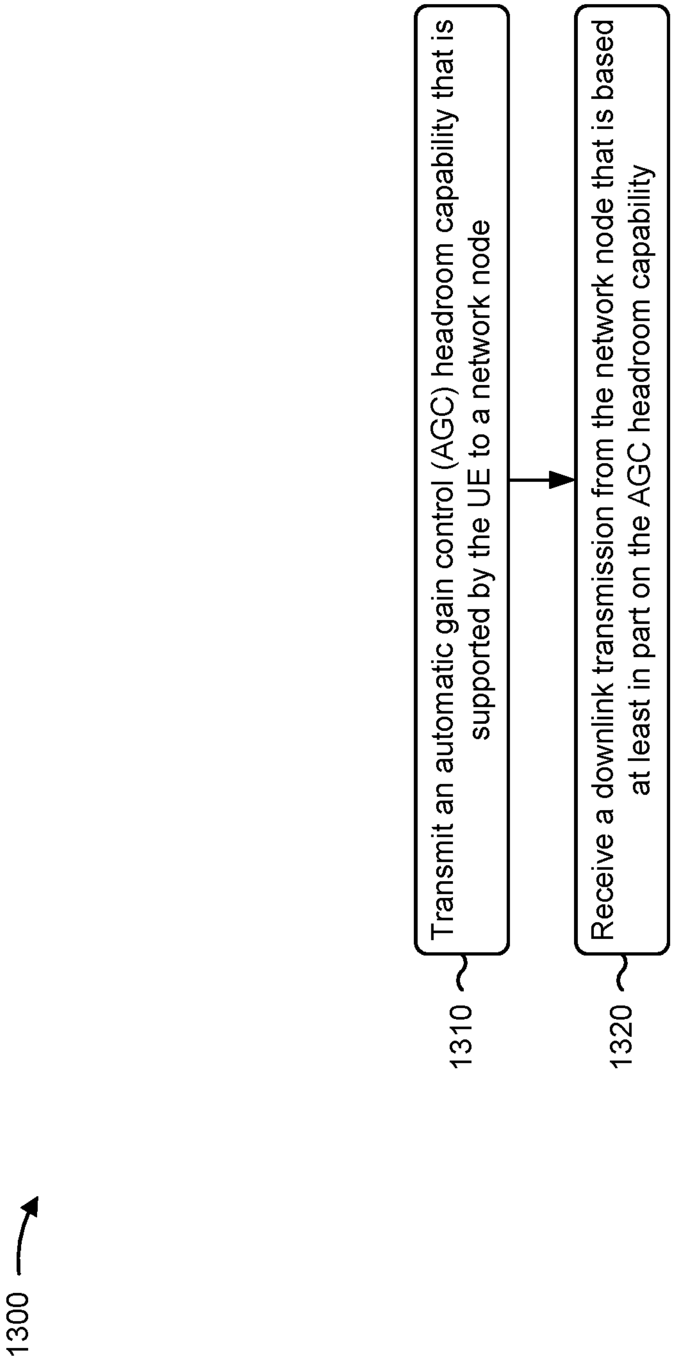
FIG. 13 is a diagram illustrating an example process performed, for example, at a UE or an apparatus of a UE, in accordance with the present disclosure.

FIG. 13 is a diagram illustrating an example process 1300 performed, for example, at a UE or an apparatus of a UE, in accordance with the present disclosure. Example process 1300 is an example where the apparatus or the UE (e.g., UE 120) performs operations associated with AGC for SBFD transmissions.

As shown in FIG. 13, in some aspects, process 1300 may include transmitting an AGC headroom capability that is supported by the UE to a network node (block 1310). For example, the UE (e.g., using transmission component 1904 and/or communication manager 1906, depicted in FIG. 19) may transmit an AGC headroom capability that is supported by the UE to a network node, as described above.

As further shown in FIG. 13, in some aspects, process 1300 may include receiving a downlink transmission from the network node that is based at least in part on the AGC headroom capability (block 1320). For example, the UE (e.g., using reception component 1902 and/or communication manager 1906, depicted in FIG. 19) may receive a downlink transmission from the network node that is based at least in part on the AGC headroom capability, as described above.

Process 1300 may include additional aspects, such as any single aspect or any combination of aspects described below and/or in connection with one or more other processes described elsewhere herein.

In a first aspect, the AGC headroom capability is associated with hardware at the UE, and process 1300 includes processing the downlink transmission using the hardware at the UE.

In a second aspect, the AGC headroom capability includes a low noise amplifier headroom capability that is applicable to multiple modulation and coding schemes.

In a third aspect, the AGC headroom capability includes multiple LNA headroom capabilities, and each LNA headroom capability of the multiple LNA headroom capabilities is applicable to a respective modulation and coding scheme.

In a fourth aspect, the AGC headroom capability includes multiple LNA headroom capabilities, and each LNA headroom capability of the multiple LNA headroom capabilities is applicable to a respective modulation and coding scheme group.

In a fifth aspect, process 1300 includes calculating one or more UE measurement metrics, and transmitting an indication of the one or more UE measurement metrics.

In a sixth aspect, the one or more UE measurement metrics comprise at least one of an inter-UE CLI metric, or a RSRP metric.

In a seventh aspect, process 1300 includes transmitting a UE capability indication that indicates support for AGC headroom capability reporting.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
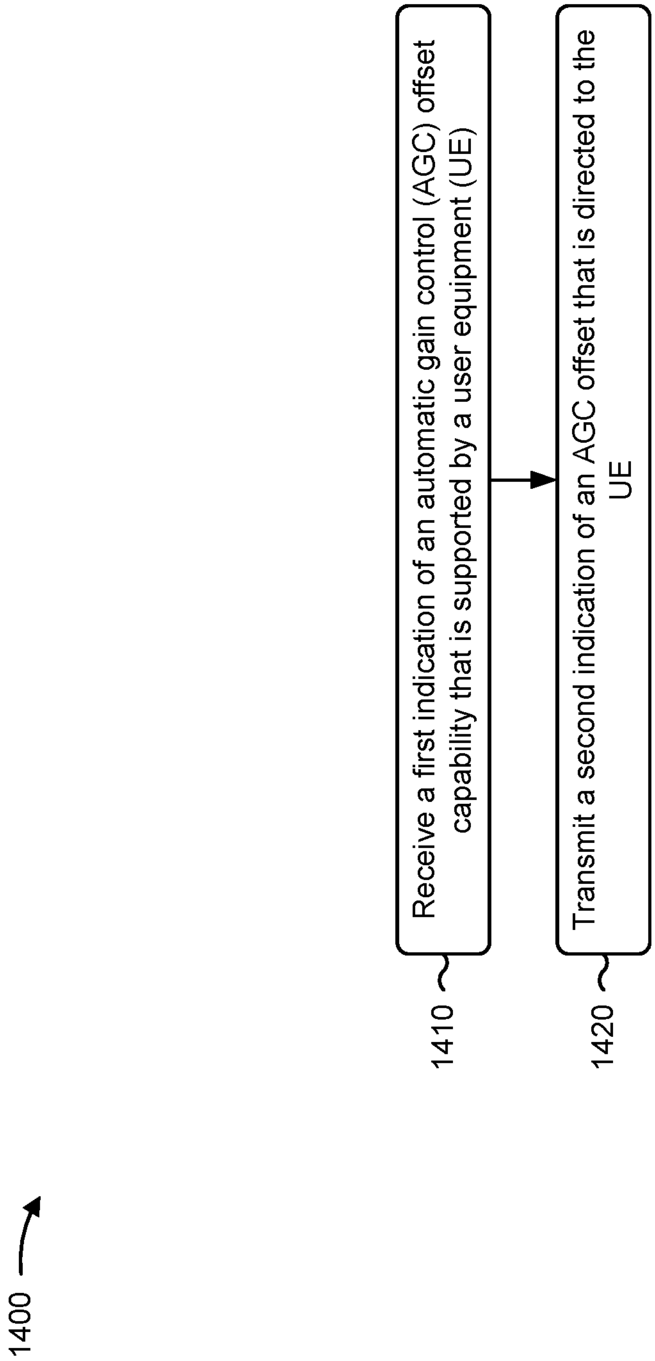
FIG. 14 is a diagram illustrating an example process performed, for example, at a network node or an apparatus of a network node, in accordance with the present disclosure.

FIG. 14 is a diagram illustrating an example process 1400 performed, for example, at a network node or an apparatus of a network node, in accordance with the present disclosure. Example process 1400 is an example where the apparatus or the network node (e.g., network node 110) performs operations associated with AGC for SBFD transmissions.

As shown in FIG. 14, in some aspects, process 1400 may include receiving a first indication of an AGC offset capability that is supported by a UE (block 1410). For example, the network node (e.g., using reception component 1802 and/or communication manager 1806, depicted in FIG. 18) may receive a first indication of an AGC offset capability that is supported by a UE, as described above.

As further shown in FIG. 14, in some aspects, process 1400 may include transmitting a second indication of an AGC offset that is directed to the UE (block 1420). For example, the network node (e.g., using transmission component 1804 and/or communication manager 1806, depicted in FIG. 18) may transmit a second indication of an AGC offset that is directed to the UE, as described above.

Process 1400 may include additional aspects, such as any single aspect or any combination of aspects described below and/or in connection with one or more other processes described elsewhere herein.

In a first aspect, process 1400 includes receiving an inter-UE CLI and RSRP metric from the UE, and calculating the AGC offset using the CLI metric.

In a second aspect, transmitting the second indication of the AGC offset includes transmitting the second indication in at least one of Layer 1 signaling, Layer 2 signaling, or Layer 3 signaling.

In a third aspect, the AGC offset includes an adjustment to an AGC feedback loop at the UE.

In a fourth aspect, the adjustment is based at least in part on a reference level for the AGC feedback loop.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
FIG. 15 is a diagram illustrating an example process performed, for example, at a UE or an apparatus of a UE, in accordance with the present disclosure.

FIG. 15 is a diagram illustrating an example process 1500 performed, for example, at a UE or an apparatus of a UE, in accordance with the present disclosure. Example process 1500 is an example where the apparatus or the UE (e.g., UE 120) performs operations associated with AGC for SBFD transmissions.

As shown in FIG. 15, in some aspects, process 1500 may include transmitting a first indication of an AGC offset capability that is supported by the UE (block 1510). For example, the UE (e.g., using transmission component 1904 and/or communication manager 1906, depicted in FIG. 19) may transmit a first indication of an AGC offset capability that is supported by the UE, as described above.

As further shown in FIG. 15, in some aspects, process 1500 may include receiving a second indication of an AGC offset that is directed to the UE (block 1520). For example, the UE (e.g., using reception component 1902 and/or communication manager 1906, depicted in FIG. 19) may receive a second indication of an AGC offset that is directed to the UE, as described above.

Process 1500 may include additional aspects, such as any single aspect or any combination of aspects described below and/or in connection with one or more other processes described elsewhere herein.

In a first aspect, process 1500 includes applying the AGC offset to one or more AGC loops, and processing a transmission using the one or more AGC loops.

In a second aspect, the one or more AGC loops include at least one of an outer low noise amplifier loop, or an inner digital variable gain amplifier loop.

In a third aspect, the transmission includes an SBFD transmission, or a non-SBFD transmission.

In a fourth aspect, process 1500 includes transmitting an inter-UE CLI metric and a RSRP metric to a network node, and the AGC offset is based at least in part on the inter-UE CLI metric and the RSRP metric.

In a fifth aspect, receiving the second indication of the AGC offset includes receiving the second indication in at least one of Layer 1 signaling, Layer 2 signaling, or Layer 3 signaling.

In a sixth aspect, receiving the second indication of the AGC offset includes receiving one or more signals, calculating, based at least in part on the one or more signals, at least one of an SBFD PDSCH RSSI, a non-SBFD PDSCH RSSI, a non-SBFD SSB RSSI, or an AGC headroom, and calculating the AGC offset using at least one of the SBFD PDSCH RSSI, the non-SBFD PDSCH RSSI, the non-SBFD SSB RSSI, or the AGC headroom.

In a seventh aspect, calculating the AGC offset includes calculating the AGC offset using a maximum of the at least one of: the SBFD PDSCH RSSI, the non-SBFD PDSCH RSSI, the non-SBFD SSB RSSI, or the AGC headroom.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
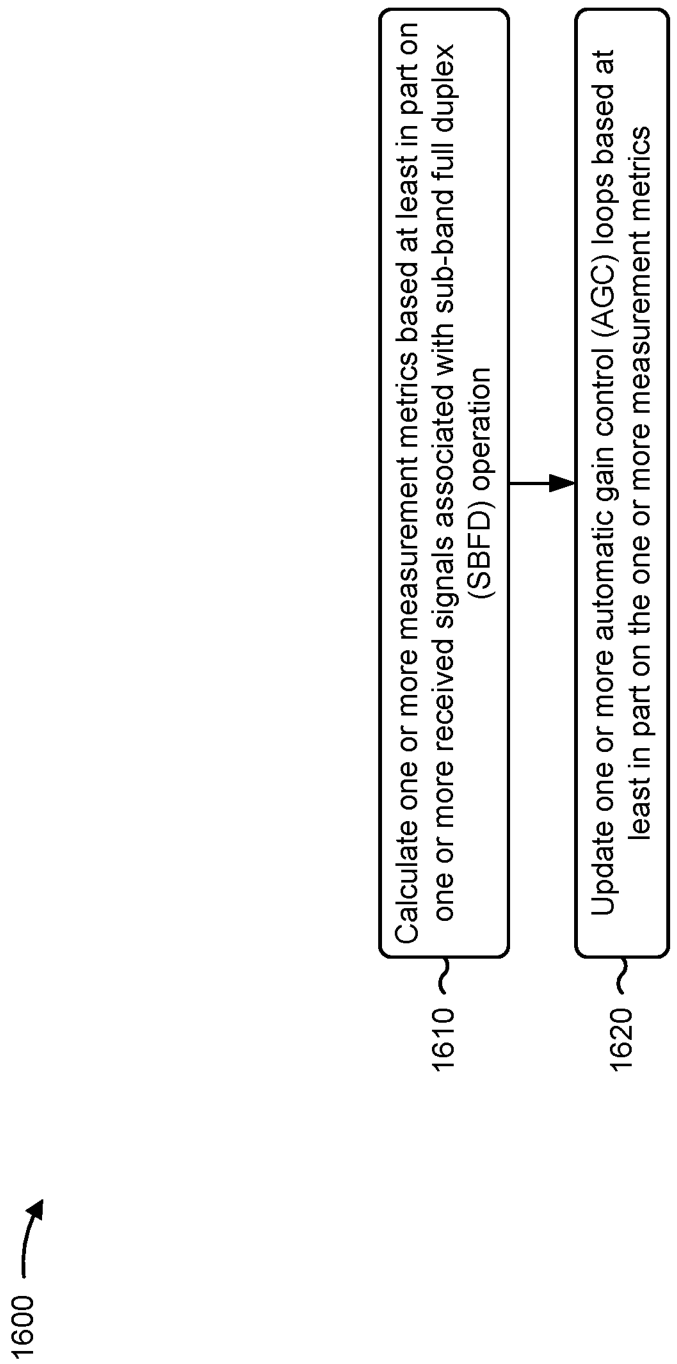
FIG. 16 is a diagram illustrating an example process performed, for example, at a UE or an apparatus of a UE, in accordance with the present disclosure.

FIG. 16 is a diagram illustrating an example process 1600 performed, for example, at a UE or an apparatus of a UE, in accordance with the present disclosure. Example process 1600 is an example where the apparatus or the UE (e.g., UE 120) performs operations associated with AGC for SBFD transmissions.

As shown in FIG. 16, in some aspects, process 1600 may include calculating one or more measurement metrics based at least in part on one or more received signals associated with SBFD operation (block 1610). For example, the UE (e.g., using communication manager 1906, depicted in FIG. 19) may calculate one or more measurement metrics based at least in part on one or more received signals associated with SBFD operation, as described above.

As further shown in FIG. 16, in some aspects, process 1600 may include updating one or more AGC loops based at least in part on the one or more measurement metrics (block 1620). For example, the UE (e.g., using communication manager 1906, depicted in FIG. 19) may update one or more AGC loops based at least in part on the one or more measurement metrics, as described above.

Process 1600 may include additional aspects, such as any single aspect or any combination of aspects described below and/or in connection with one or more other processes described elsewhere herein.

In a first aspect, the one or more received signals include one or more SSBs, and the one or more measurement metrics include at least one of an SBFD PDSCH RSSI, a non-SBFD PDSCH RSSI, or an SSB RSSI.

In a second aspect, process 1600 includes calculating each of the SBFD PDSCH RSSI, the non-SBFD PDSCH RSSI, and the SSB RSSI, and selecting a maximum from the SBFD PDSCH RSSI, the non-SBFD PDSCH RSSI, and the SSB RSSI, and updating the one or more AGC loops includes updating the one or more AGC loops using the maximum.

In a third aspect, the one or more AGC loop include at least one of an outer low noise amplifier AGC loop for a receiver, or an inner digital variable gain amplifier loop for the receiver.

In a fourth aspect, the one or more AGC loops comprise at least one of an outer LNA AGC loop that is used for both a SBFD transmission and a non-SBFD transmission, an SBFD inner DVGA loop that is used for the SBFD transmission, or a non-SBFD DVGA loop that is used for the non-SBFD transmission.

In a fifth aspect, updating the one or more AGC loops includes updating, based at least in part on operating in an SBFD mode, the outer LNA AGC loop based at least in part on an SBFD measurement metric of the one or more measurement metrics, and updating, based at least in part on operating in the SBFD mode, the SBFD inner DVGA loop based at least in part on the SBFD measurement metric.

In a sixth aspect, process 1600 includes disabling, based at least in part on operating in the SBFD mode, the non-SBFD inner DVGA loop.

In a seventh aspect, updating the one or more AGC loops includes updating, based at least in part on operating in a non-SBFD mode, the outer LNA AGC loop based at least in part on a non-SBFD measurement metric of the one or more measurement metrics, and updating, based at least in part on operating in the non-SBFD mode, the non-SBFD inner DVGA loop based at least in part on the non-SBFD measurement metric.

In an eighth aspect, process 1600 includes disabling, based at least in part on operating in the non-SBFD mode, the non-SBFD inner DVGA loop.

In a ninth aspect, the one or more AGC loops comprise at least one of a SBFD outer LNA AGC loop that is used for an SBFD transmission, a non-SBFD outer LNA AGC loop that is used for a non-SBFD transmission, an SBFD inner DVGA loop that is used for the SBFD transmission, or a non-SBFD DVGA loop that is used for the non-SBFD transmission.

In a tenth aspect, process 1600 includes switching between using the SBFD outer LNA AGC loop and the non-SBFD outer LNA AGC loop based at least in part on a transition between an SBFD slot and a non-SBFD slot, and switching between using the SBFD inner DVGA loop and the non-SBFD inner DVGA loop based at least in part on the transition between the SBFD slot and the non-SBFD slot.

In an eleventh aspect, process 1600 includes updating at least one of the SBFD outer LNA AGC loop, the non-SBFD outer LNA AGC loop, the SBFD inner DVGA loop, or the non-SBFD inner DVGA loop based at least in part on the transition between the SBFD slot and the non-SBFD slot.

In a twelfth aspect, the one or more measurement metrics comprise at least one of a SSB RSSI, a non-SBFD PDSCH RSSI, or an SBFD PDSCH RSSI, and process 1600 includes updating, based at least in part on an SSB periodicity, the one or more AGC loops using the one or more measurement metrics.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
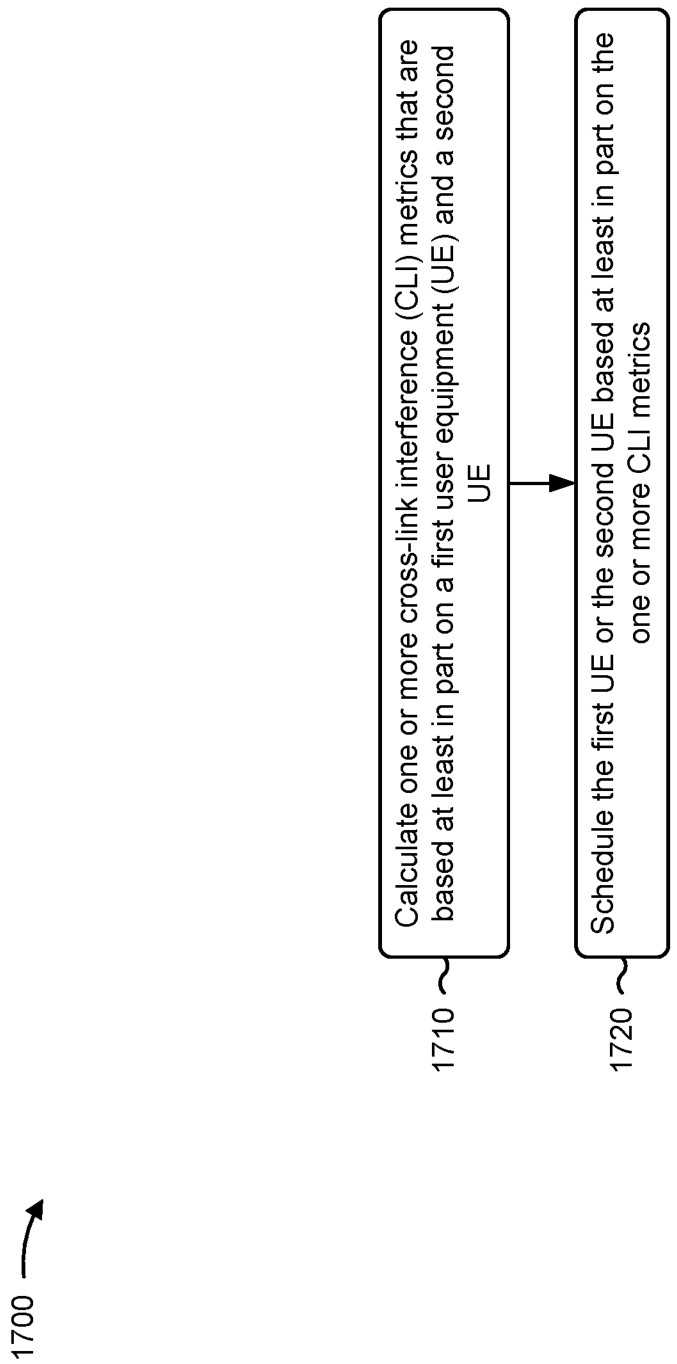
FIG. 17 is a diagram illustrating an example process performed, for example, at a network node or an apparatus of a network node, in accordance with the present disclosure.

FIG. 17 is a diagram illustrating an example process 1700 performed, for example, at a network node or an apparatus of a network node, in accordance with the present disclosure. Example process 1700 is an example where the apparatus or the network node (e.g., network node 110) performs operations associated with AGC for SBFD transmissions.

As shown in FIG. 17, in some aspects, process 1700 may include calculating one or more CLI metrics that are based at least in part on a first UE and a second UE (block 1710). For example, the network node (e.g., using communication manager 1806, depicted in FIG. 18) may calculate one or more CLI metrics that are based at least in part on a first UE and a second UE, as described above.

As further shown in FIG. 17, in some aspects, process 1700 may include scheduling the first UE or the second UE based at least in part on the one or more CLI metrics (block 1720). For example, the network node (e.g., using communication manager 1806, depicted in FIG. 18) may schedule the first UE or the second UE based at least in part on the one or more CLI metrics, as described above.

Process 1700 may include additional aspects, such as any single aspect or any combination of aspects described below and/or in connection with one or more other processes described elsewhere herein.

In a first aspect, process 1700 includes receiving an AGC headroom capability that is supported by the first UE or the second UE, and scheduling the first UE or the second UE includes scheduling the at the first UE and the second UE using the AGC headroom capability.

In a second aspect, process 1700 includes computing, based at least in part on the one or more CLI metrics, that an uplink transmission configuration satisfies the AGC headroom capability, and computing, based at least in part on the one or more CLI metrics, that a downlink transmission configuration satisfies the AGC headroom capability, and scheduling the first UE or the second UE includes co-scheduling the first UE and the second UE using the uplink transmission configuration and the downlink transmission configuration based at least in part on the uplink transmission configuration and the downlink transmission configuration satisfying the AGC headroom capability.

In a third aspect, process 1700 includes computing, based at least in part on the one or more CLI metrics, that at least one of an uplink transmission configuration or a downlink transmission configuration fails to satisfy the AGC headroom capability, and scheduling the first UE or the second UE includes refraining from co-scheduling the first UE and the second UE using the uplink transmission configuration and the downlink transmission configuration based at least in part on the at least one of the uplink transmission configuration or the downlink transmission configuration failing to satisfy the AGC headroom capability.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
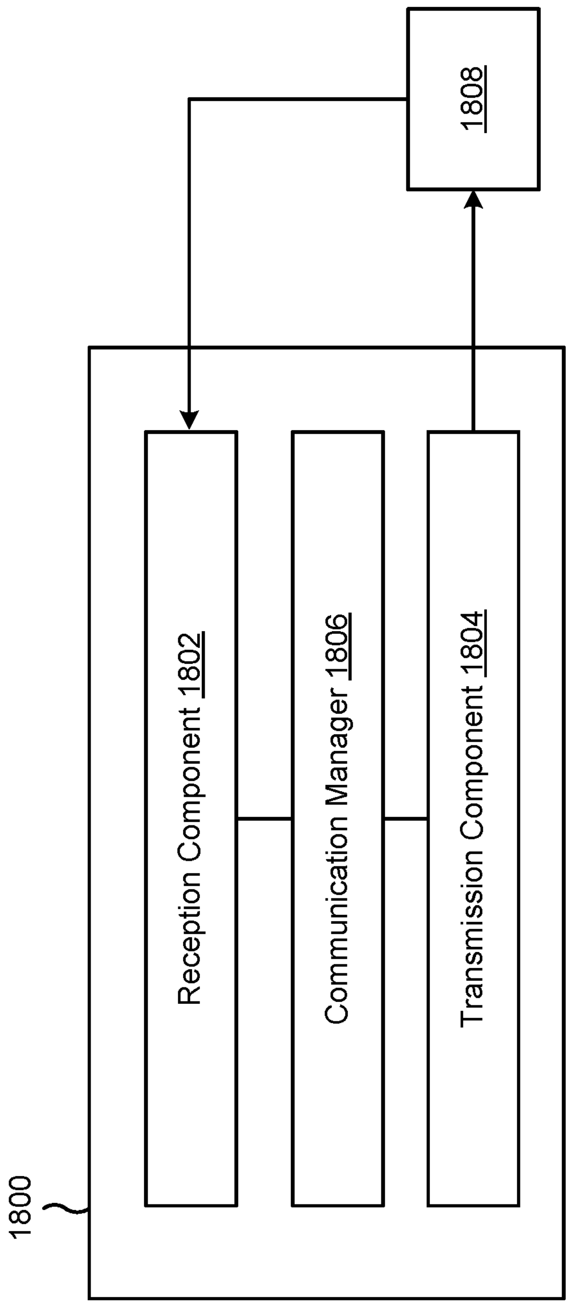
FIG. 18 is a diagram of an example apparatus for wireless communication, in accordance with the present disclosure.

FIG. 18 is a diagram of an example apparatus 1800 for wireless communication, in accordance with the present disclosure. The apparatus 1800 may be a network node, or a network node may include the apparatus 1800. In some aspects, the apparatus 1800 includes a reception component 1802, a transmission component 1804, and/or a communication manager 1806, which may be in communication with one another (for example, via one or more buses and/or one or more other components). In some aspects, the communication manager 1806 is the communication manager 150 described in connection with FIG. 1. As shown, the apparatus 1800 may communicate with another apparatus 1808, such as a UE or a network node (such as a CU, a DU, an RU, or a base station), using the reception component 1802 and the transmission component 1804.

In some aspects, the apparatus 1800 may be configured to perform one or more operations described herein in connection with FIGS. 6-11B. Additionally, or alternatively, the apparatus 1800 may be configured to perform one or more processes described herein, such as process 1200 of FIG. 12, process 1400 of FIG. 14, process 1700 of FIG. 17, or a combination thereof. In some aspects, the apparatus 1800 and/or one or more components shown in FIG. 18 may include one or more components of the network node described in connection with FIG. 2. Additionally, or alternatively, one or more components shown in FIG. 18 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1802 may receive communications, such as reference signals, control information, data communications, or a combination thereof, from the apparatus 1808. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1800. In some aspects, the reception component 1802 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 1802 and/or the transmission component 1804 may include or may be included in a network interface. The network interface may be configured to obtain and/or output signals for the apparatus 1800 via one or more communications links, such as a backhaul link, a midhaul link, and/or a fronthaul link.

The transmission component 1804 may transmit communications, such as reference signals, control information, data communications, or a combination thereof, to the apparatus 1808. In some aspects, one or more other components of the apparatus 1800 may generate communications and may provide the generated communications to the transmission component 1804 for transmission to the apparatus 1808. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1808. In some aspects, the transmission component 1804 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 1804 may be co-located with the reception component 1802 in one or more transceivers.

The communication manager 1806 may support operations of the reception component 1802 and/or the transmission component 1804. For example, the communication manager 1806 may receive information associated with configuring reception of communications by the reception component 1802 and/or transmission of communications by the transmission component 1804. Additionally, or alternatively, the communication manager 1806 may generate and/or provide control information to the reception component 1802 and/or the transmission component 1804 to control reception and/or transmission of communications.

The reception component 1802 may receive an AGC headroom capability that is supported by a first UE. The communication manager 1806 may adjust, based at least in part on the AGC headroom capability, a transmission power level for an uplink transmission from a second UE that is transmitted in a same OFDM symbol as a downlink transmission to the first UE.

The reception component 1802 may receive one or more measurement metrics from the first UE. Alternatively, or additionally, the communication manager 1806 may calculate an adjustment value for the transmission power level of the second UE based at least in part on the one or more measurement metrics from the first UE and the AGC headroom capability. In some aspects, the reception component 1802 may receive a UE capability indication from the UE that indicates support for AGC headroom capability reporting.

The reception component 1802 may receive a first indication of an AGC offset capability that is supported by a UE. The transmission component 1804 may transmit a second indication of an AGC offset that is directed to the UE. In some aspects, the reception component 1802 may receive an inter-UE CLI and RSRP metric from the UE. Alternatively, or additionally, the communication manager 1806 may calculate the AGC offset using the CLI metric.

In some aspects, the communication manager 1806 may calculate one or more CLI metrics that are based at least in part on a first UE and a second UE. The communication manager 1806 may schedule the first UE or the second UE based at least in part on the one or more CLI metrics. Alternatively, or additionally, the reception component 1802 may receive an AGC headroom capability that is supported by the first UE or the second UE. In some aspects, the communication manager 1806 may compute, based at least in part on the one or more CLI metrics, that an uplink transmission configuration satisfies the AGC headroom capability. Alternatively, or additionally, the communication manager 1806 may compute, based at least in part on the one or more CLI metrics, that a downlink transmission configuration satisfies the AGC headroom capability. In some aspects, the communication manager 1806 may compute, based at least in part on the one or more CLI metrics, that at least one of an uplink transmission configuration or a downlink transmission configuration fails to satisfy the AGC headroom capability.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

Figure 19:
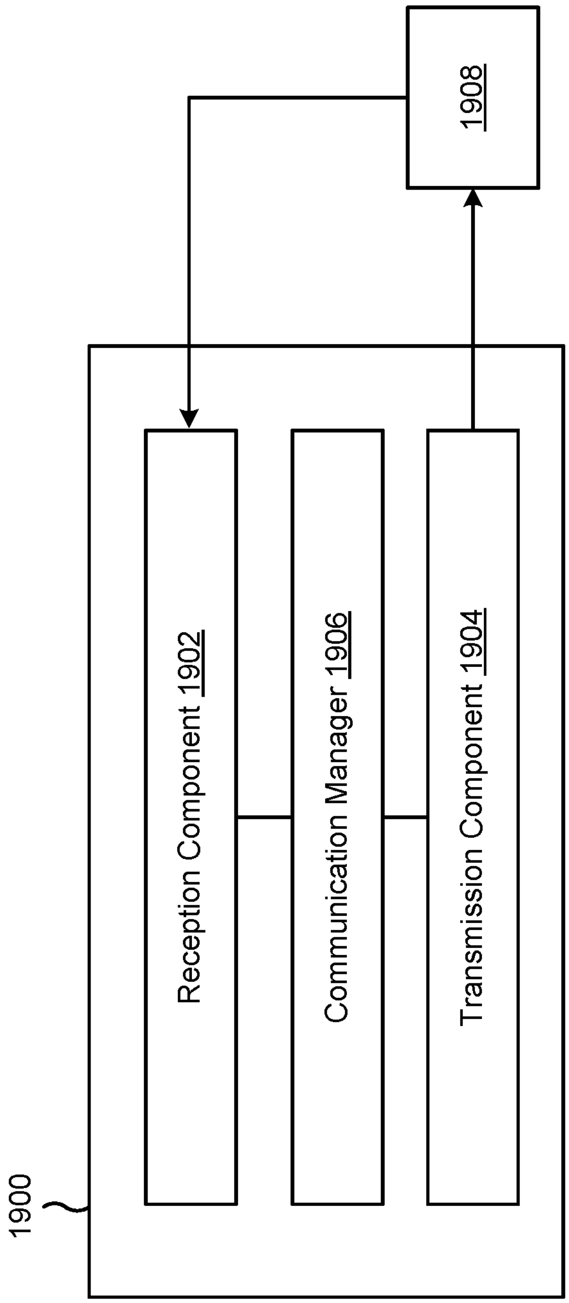
FIG. 19 is a diagram of an example apparatus for wireless communication, in accordance with the present disclosure.

FIG. 19 is a diagram of an example apparatus 1900 for wireless communication, in accordance with the present disclosure. The apparatus 1900 may be a UE, or a UE may include the apparatus 1900. In some aspects, the apparatus 1900 includes a reception component 1902, a transmission component 1904, and/or a communication manager 1906, which may be in communication with one another (for example, via one or more buses and/or one or more other components). In some aspects, the communication manager 1906 is the communication manager 140 described in connection with FIG. 1. As shown, the apparatus 1900 may communicate with another apparatus 1908, such as a UE or a network node (such as a CU, a DU, an RU, or a base station), using the reception component 1902 and the transmission component 1904.

In some aspects, the apparatus 1900 may be configured to perform one or more operations described herein in connection with FIGS. 6-11B. Additionally, or alternatively, the apparatus 1900 may be configured to perform one or more processes described herein, such as process 1300 of FIG. 13, process 1500 of FIG. 15, process 1600 of FIG. 16, or a combination thereof. In some aspects, the apparatus 1900 and/or one or more components shown in FIG. 19 may include one or more components of the UE described in connection with FIG. 2. Additionally, or alternatively, one or more components shown in FIG. 19 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1902 may receive communications, such as reference signals, control information, data communications, or a combination thereof, from the apparatus 1908. The reception component 1902 may provide received communications to one or more other components of the apparatus 1900. In some aspects, the reception component 1902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1900. In some aspects, the reception component 1902 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 1904 may transmit communications, such as reference signals, control information, data communications, or a combination thereof, to the apparatus 1908. In some aspects, one or more other components of the apparatus 1900 may generate communications and may provide the generated communications to the transmission component 1904 for transmission to the apparatus 1908. In some aspects, the transmission component 1904 may perform signal processing on the generated communications (such as filtering, amplification, modulation, digital-to-analog conversion, multiplexing, interleaving, mapping, or encoding, among other examples), and may transmit the processed signals to the apparatus 1908. In some aspects, the transmission component 1904 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 1904 may be co-located with the reception component 1902 in one or more transceivers.

The communication manager 1906 may support operations of the reception component 1902 and/or the transmission component 1904. For example, the communication manager 1906 may receive information associated with configuring reception of communications by the reception component 1902 and/or transmission of communications by the transmission component 1904. Additionally, or alternatively, the communication manager 1906 may generate and/or provide control information to the reception component 1902 and/or the transmission component 1904 to control reception and/or transmission of communications.

The transmission component 1904 may transmit an AGC headroom capability that is supported by the UE to a network node. The reception component 1902 may receive a downlink transmission from the network node that is based at least in part on the AGC headroom capability. In some aspects, the communication manager 1906 may calculate one or more UE measurement metrics. Alternatively, or additionally, the transmission component 1904 may transmit an indication of the one or more UE measurement metrics. In some aspects, the transmission component 1904 may transmit a UE capability indication that indicates support for AGC headroom capability reporting.

The transmission component 1904 may transmit a first indication of an AGC offset capability that is supported by the UE. The reception component 1902 may receive a second indication of an AGC offset that is directed to the UE. In some aspects, the communication manager 1906 may apply the AGC offset to one or more AGC loops. Alternatively, or additionally, the communication manager 1906 may process a transmission using the one or more AGC loops. In some aspects, the transmission component 1904 may transmit an inter-UE CLI metric and a RSRP metric to a network node and the AGC offset is based at least in part on the inter-UE CLI metric and the RSRP metric.

The communication manager 1906 may calculate one or more measurement metrics based at least in part on one or more received signals associated with SBFD operation. The communication manager 1906 may update one or more AGC loops based at least in part on the one or more measurement metrics. In some aspects, the communication manager 1906 may calculate each of SBFD PDSCH RSSI, non-SBFD PDSCH RSSI, and a SSB RSSI. The communication manager 1906 may select a maximum from the SBFD PDSCH RSSI, the non-SBFD PDSCH RSSI, and the SSB RSSI. In some aspects, the communication manager 1906 may disable, based at least in part on operating in the SBFD mode, the non-SBFD inner DVGA loop. Alternatively, or additionally, the communication manager 1906 may disable, based at least in part on operating in the non-SBFD mode, the non-SBFD inner DVGA loop. The communication manager 1906 may switch between using the SBFD outer LNA AGC loop and the non-SBFD outer LNA AGC loop based at least in part on a transition between an SBFD slot and a non-SBFD slot. In some aspects, the communication manager 1906 may switch between using the SBFD inner DVGA loop and the non-SBFD inner DVGA loop based at least in part on the transition between the SBFD slot and the non-SBFD slot. Alternatively, or additionally, the communication manager 1906 may update at least one of the SBFD outer LNA AGC loop, the non-SBFD outer LNA AGC loop, the SBFD inner DVGA loop, or the non-SBFD inner DVGA loop based at least in part on the transition between the SBFD slot and the non-SBFD slot.

The number and arrangement of components shown in FIG. 19 are provided as an example. In practice, there may be additional components, fewer components, different components, or differently arranged components than those shown in FIG. 19. Furthermore, two or more components shown in FIG. 19 may be implemented within a single component, or a single component shown in FIG. 19 may be implemented as multiple, distributed components. Additionally, or alternatively, a set of (one or more) components shown in FIG. 19 may perform one or more functions described as being performed by another set of components shown in FIG. 19.

The following provides an overview of some Aspects of the present disclosure:

Aspect 1: A method of wireless communication performed by a network node, comprising: receiving an automatic gain control (AGC) headroom capability that is supported by a first user equipment (UE); and adjusting, based at least in part on the AGC headroom capability, a transmission power level for an uplink transmission from a second UE that is transmitted in a same orthogonal frequency division multiplexing (OFDM) symbol as a downlink transmission to the first UE.

Aspect 2: The method of Aspect 1, wherein adjusting the transmission power level comprises: adjusting the transmission power level to mitigate saturation of hardware at the first UE.

Aspect 3: The method of any of Aspects 1-2, wherein the AGC headroom capability includes a low noise amplifier headroom capability that is applicable to multiple modulation and coding schemes.

Aspect 4: The method of any of Aspects 1-3, wherein the AGC headroom capability includes multiple low noise amplifier (LNA) headroom capabilities, and wherein each LNA headroom capability of the multiple LNA headroom capabilities is applicable to a respective modulation and coding scheme.

Aspect 5: The method of any of Aspects 1-4, wherein the AGC headroom capability includes multiple low noise amplifier (LNA) headroom capabilities, and wherein each LNA headroom capability of the multiple LNA headroom capabilities is applicable to a respective modulation and coding scheme group.

Aspect 6: The method of any of Aspects 1-5, further comprising: receiving one or more measurement metrics from the first UE; and calculating an adjustment value for the transmission power level of the second UE based at least in part on the one or more measurement metrics from the first UE and the AGC headroom capability, wherein adjusting the transmission power level comprises: adjusting the transmission power level using the adjustment value, wherein adjusting the transmission power level comprises: adjusting the transmission power level using the adjustment value.

Aspect 7: The method of Aspect 6, wherein the one or more measurement metrics from the first UE comprise at least one of: an inter-UE cross-link interference (CLI) metric; or a reference signal received power (RSRP) metric.

Aspect 8: The method of any of Aspects 1-7, further comprising: receiving a UE capability indication from the UE that indicates support for AGC headroom capability reporting.

Aspect 9: The method of any of Aspects 1-8, further comprising: obtaining one or more cross-link interference (CLI) metrics that are based at least in part on the first UE and the second UE; and scheduling at least one of the first UE or the second UE using the one or more CLI metrics.

Aspect 10: A method of wireless communication performed by a user equipment (UE), comprising: transmitting an automatic gain control (AGC) headroom capability that is supported by the UE to a network node; and receiving a downlink transmission from the network node that is based at least in part on the AGC headroom capability.

Aspect 11: The method of Aspect 10, wherein the AGC headroom capability is associated with hardware at the UE, and wherein the method further comprises: processing the downlink transmission using the hardware at the UE.

Aspect 12: The method of any of Aspects 10-11, wherein the AGC headroom capability includes a low noise amplifier headroom capability that is applicable to multiple modulation and coding schemes.

Aspect 13: The method of any of Aspects 10-12, wherein the AGC headroom capability includes multiple low noise amplifier (LNA) headroom capabilities, and wherein each LNA headroom capability of the multiple LNA headroom capabilities is applicable to a respective modulation and coding scheme.

Aspect 14: The method of any of Aspects 10-13, wherein the AGC headroom capability includes multiple low noise amplifier (LNA) headroom capabilities, and wherein each LNA headroom capability of the multiple LNA headroom capabilities is applicable to a respective modulation and coding scheme group.

Aspect 15: The method of any of Aspects 10-14, further comprising: calculating one or more UE measurement metrics; and transmitting an indication of the one or more UE measurement metrics.

Aspect 16: The method of Aspect 15, wherein the one or more UE measurement metrics comprise at least one of: an inter-UE cross-link interference (CLI) metric; or a reference signal received power (RSRP) metric.

Aspect 17: The method of any of Aspects 10-16, further comprising: transmitting a UE capability indication that indicates support for AGC headroom capability reporting.

Aspect 18: A method of wireless communication performed by a network node, comprising: receiving a first indication of an automatic gain control (AGC) offset capability that is supported by a user equipment (UE); and transmitting a second indication of an AGC offset that is directed to the UE.

Aspect 19: The method of Aspect 18, further comprising: receiving an inter-UE cross-link interference (CLI) and RSRP metric from the UE; and calculating the AGC offset using the CLI metric.

Aspect 20: The method of any of Aspects 18-19, wherein transmitting the second indication of the AGC offset comprises: transmitting the second indication in at least one of: Layer 1 signaling, Layer 2 signaling, or Layer 3 signaling.

Aspect 21: The method of any of Aspects 18-29, wherein the AGC offset comprises an adjustment to an AGC feedback loop at the UE.

Aspect 22: The method of Aspect 21, wherein the adjustment is based at least in part on a reference level for the AGC feedback loop.

Aspect 23: A method of wireless communication performed by a user equipment (UE), comprising transmitting a first indication of an automatic gain control (AGC) offset capability that is supported by the UE; and receiving a second indication of an AGC offset that is directed to the UE.

Aspect 24: The method of Aspect 23, further comprising: applying the AGC offset to one or more AGC loops; and processing a transmission using the one or more AGC loops.

Aspect 25: The method of Aspect 24, wherein the one or more AGC loops comprises at least one of: an outer low noise amplifier loop, or an inner digital variable gain amplifier loop.

Aspect 26: The method of Aspect 24, wherein the transmission comprises: a sub-band full duplex (SBFD) transmission, or a non-SBFD transmission.

Aspect 27: The method of any of Aspects 23-26, further comprising: transmitting an inter-UE CLI metric and a reference signal received power (RSRP) metric to a network node, wherein the AGC offset is based at least in part on the inter-UE CLI metric and the RSRP metric.

Aspect 28: The method of any of Aspects 23-27, wherein receiving the second indication of the AGC offset comprises: receiving the second indication in at least one of: Layer 1 signaling, Layer 2 signaling, or Layer 3 signaling.

Aspect 29: The method of any of Aspects 23-28, wherein receiving the second indication of the AGC offset comprises: receiving one or more signals; calculating, based at least in part on the one or more signals, at least one of: a sub-band full duplex (SBFD) physical downlink shared channel (PDSCH) received signal strength indicator (RSSI), a non-SBFD PDSCH RSSI, a non-SBFD synchronization signal block (SSB) RSSI, or an AGC headroom; and calculating the AGC offset using at least one of: the SBFD PDSCH RSSI, the non-SBFD PDSCH RSSI, the non-SBFD SSB RSSI, or the AGC headroom.

Aspect 30: The method of Aspect 29, wherein calculating the AGC offset comprises: calculating the AGC offset using a maximum of the at least one of: the SBFD PDSCH RSSI, the non-SBFD PDSCH RSSI, the non-SBFD SSB RSSI, or the AGC headroom.

Aspect 31: A method of wireless communication performed by a user equipment (UE), comprising: calculating one or more measurement metrics based at least in part on one or more received signals associated with sub-band full duplex (SBFD) operation; and updating one or more automatic gain control (AGC) loops based at least in part on the one or more measurement metrics.

Aspect 32: The method of Aspect 31, wherein the one or more received signals comprises one or more synchronization signal blocks (SSBs), and wherein the one or more measurement metrics comprises at least one of: a sub-band full duplex (SBFD) physical downlink shared channel (PDSCH) received signal strength indicator (RSSI), a non-SBFD PDSCH RSSI, or an SSB RSSI.

Aspect 33: The method of Aspect 32, further comprising: calculating each of the SBFD PDSCH RSSI, the non-SBFD PDSCH RSSI, and the SSB RSSI; and selecting a maximum from the SBFD PDSCH RSSI, the non-SBFD PDSCH RSSI, and the SSB RSSI, wherein updating the one or more AGC loops comprises: updating the one or more AGC loops using the maximum, wherein updating the one or more AGC loops comprises: updating the one or more AGC loops using the maximum.

Aspect 34: The method of Aspect 33, wherein the one or more AGC loops comprise at least one of: an outer low noise amplifier AGC loop for a receiver, or an inner digital variable gain amplifier loop for the receiver.

Aspect 35: The method of any of Aspects 31-34, wherein the one or more AGC loops comprise at least one of: an outer low noise amplifier (LNA) AGC loop that is used for both a sub-band full duplex (SBFD) transmission and a non-SBFD transmission, an SBFD inner digital variable gain amplifier (DVGA) loop that is used for the SBFD transmission, or a non-SBFD DVGA loop that is used for the non-SBFD transmission.

Aspect 36: The method of Aspect 35, wherein updating the one or more AGC loops comprises: updating, based at least in part on operating in an SBFD mode, the outer LNA AGC loop based at least in part on an SBFD measurement metric of the one or more measurement metrics; and updating, based at least in part on operating in the SBFD mode, the SBFD inner DVGA loop based at least in part on the SBFD measurement metric.

Aspect 37: The method of Aspect 36, further comprising: disabling, based at least in part on operating in the SBFD mode, the non-SBFD inner DVGA loop.

Aspect 38: The method of Aspect 37, wherein updating the one or more AGC loops comprises: updating, based at least in part on operating in a non-SBFD mode, the outer LNA AGC loop based at least in part on a non-SBFD measurement metric of the one or more measurement metrics; and updating, based at least in part on operating in the non-SBFD mode, the non-SBFD inner DVGA loop based at least in part on the non-SBFD measurement metric.

Aspect 39: The method of Aspect 38, further comprising: disabling, based at least in part on operating in the non-SBFD mode, the non-SBFD inner DVGA loop.

Aspect 40: The method of any of Aspects 31-39, wherein the one or more AGC loops comprise at least one of: a sub-band full duplex (SBFD) outer low noise amplifier (LNA) AGC loop that is used for an SBFD transmission, a non-SBFD outer LNA AGC loop that is used for a non-SBFD transmission, an SBFD inner digital variable gain amplifier (DVGA) loop that is used for the SBFD transmission, or a non-SBFD DVGA loop that is used for the non-SBFD transmission.

Aspect 41: The method of Aspect 40, further comprising: switching between using the SBFD outer LNA AGC loop and the non-SBFD outer LNA AGC loop based at least in part on a transition between an SBFD slot and a non-SBFD slot; and switching between using the SBFD inner DVGA loop and the non-SBFD inner DVGA loop based at least in part on the transition between the SBFD slot and the non-SBFD slot.

Aspect 42: The method of Aspect 41, further comprising: updating at least one of the SBFD outer LNA AGC loop, the non-SBFD outer LNA AGC loop, the SBFD inner DVGA loop, or the non-SBFD inner DVGA loop based at least in part on the transition between the SBFD slot and the non-SBFD slot.

Aspect 43: The method of Aspect 42, wherein the one or more measurement metrics comprise at least one of: a synchronization signal block (SSB) received signal strength indicator (RSSI), a non-SBFD physical downlink shared channel (PDSCH) RSSI, or an SBFD PDSCH RSSI; and the method further comprises: updating, based at least in part on an SSB periodicity, the one or more AGC loops using the one or more measurement metrics.

Aspect 44: A method of wireless communication performed by a network node, comprising: calculating one or more cross-link interference (CLI) metrics that are based at least in part on a first user equipment (UE) and a second UE; and scheduling the first UE or the second UE based at least in part on the one or more CLI metrics.

Aspect 45: The method of Aspect 44, further comprising: receiving an automatic gain control (AGC) headroom capability that is supported by the first UE or the second UE, wherein scheduling the first UE or the second UE comprises: scheduling the at the first UE and the second UE using the AGC headroom capability, and wherein scheduling the first UE or the second UE comprises: scheduling the at the first UE and the second UE using the AGC headroom capability.

Aspect 46: The method of any of Aspects 44-45, further comprising: computing, based at least in part on the one or more CLI metrics, that an uplink transmission configuration satisfies the AGC headroom capability; and computing, based at least in part on the one or more CLI metrics, that a downlink transmission configuration satisfies the AGC headroom capability, and wherein scheduling the first UE or the second UE comprises: co-scheduling the first UE and the second UE using the uplink transmission configuration and the downlink transmission configuration based at least in part on the uplink transmission configuration and the downlink transmission configuration satisfying the AGC headroom capability, and wherein scheduling the first UE or the second UE comprises: co-scheduling the first UE and the second UE using the uplink transmission configuration and the downlink transmission configuration based at least in part on the uplink transmission configuration and the downlink transmission configuration satisfying the AGC headroom capability.

Aspect 47: The method of any of Aspects 44-46, further comprising: computing, based at least in part on the one or more CLI metrics, that at least one of an uplink transmission configuration or a downlink transmission configuration fails to satisfy the AGC headroom capability, and wherein scheduling the first UE or the second UE comprises: refraining from co-scheduling the first UE and the second UE using the uplink transmission configuration and the downlink transmission configuration based at least in part on the at least one of the uplink transmission configuration or the downlink transmission configuration failing to satisfy the AGC headroom capability, and wherein scheduling the first UE or the second UE comprises: refraining from co-scheduling the first UE and the second UE using the uplink transmission configuration and the downlink transmission configuration based at least in part on the at least one of the uplink transmission configuration or the downlink transmission configuration failing to satisfy the AGC headroom capability.

Aspect 48: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-9.

Aspect 49: An apparatus for wireless communication at a device, the apparatus comprising one or more memories and one or more processors coupled to the one or more memories, the one or more processors configured to cause the device to perform the method of one or more of Aspects 1-9.

Aspect 50: An apparatus for wireless communication, the apparatus comprising at least one means for performing the method of one or more of Aspects 1-9.

Aspect 51: A non-transitory computer-readable medium storing code for wireless communication, the code comprising instructions executable by one or more processors to perform the method of one or more of Aspects 1-9.

Aspect 52: A non-transitory computer-readable medium storing a set of instructions for wireless communication, the set of instructions comprising one or more instructions that, when executed by one or more processors of a device, cause the device to perform the method of one or more of Aspects 1-9.

Aspect 53: A device for wireless communication, the device comprising a processing system that includes one or more processors and one or more memories coupled with the one or more processors, the processing system configured to cause the device to perform the method of one or more of Aspects 1-9.

Aspect 54: An apparatus for wireless communication at a device, the apparatus comprising one or more memories and one or more processors coupled to the one or more memories, the one or more processors individually or collectively configured to cause the device to perform the method of one or more of Aspects 1-9.

Aspect 55: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 10-17.

Aspect 56: An apparatus for wireless communication at a device, the apparatus comprising one or more memories and one or more processors coupled to the one or more memories, the one or more processors configured to cause the device to perform the method of one or more of Aspects 10-17.

Aspect 57: An apparatus for wireless communication, the apparatus comprising at least one means for performing the method of one or more of Aspects 10-17.

Aspect 58: A non-transitory computer-readable medium storing code for wireless communication, the code comprising instructions executable by one or more processors to perform the method of one or more of Aspects 10-17.

Aspect 59: A non-transitory computer-readable medium storing a set of instructions for wireless communication, the set of instructions comprising one or more instructions that, when executed by one or more processors of a device, cause the device to perform the method of one or more of Aspects 10-17.

Aspect 60: A device for wireless communication, the device comprising a processing system that includes one or more processors and one or more memories coupled with the one or more processors, the processing system configured to cause the device to perform the method of one or more of Aspects 10-17.

Aspect 61: An apparatus for wireless communication at a device, the apparatus comprising one or more memories and one or more processors coupled to the one or more memories, the one or more processors individually or collectively configured to cause the device to perform the method of one or more of Aspects 10-17.

Aspect 62: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 18-22.

Aspect 63: An apparatus for wireless communication at a device, the apparatus comprising one or more memories and one or more processors coupled to the one or more memories, the one or more processors configured to cause the device to perform the method of one or more of Aspects 18-22.

Aspect 64: An apparatus for wireless communication, the apparatus comprising at least one means for performing the method of one or more of Aspects 18-22.

Aspect 65: A non-transitory computer-readable medium storing code for wireless communication, the code comprising instructions executable by one or more processors to perform the method of one or more of Aspects 18-22.

Aspect 66: A non-transitory computer-readable medium storing a set of instructions for wireless communication, the set of instructions comprising one or more instructions that, when executed by one or more processors of a device, cause the device to perform the method of one or more of Aspects 18-22.

Aspect 67: A device for wireless communication, the device comprising a processing system that includes one or more processors and one or more memories coupled with the one or more processors, the processing system configured to cause the device to perform the method of one or more of Aspects 18-22.

Aspect 68: An apparatus for wireless communication at a device, the apparatus comprising one or more memories and one or more processors coupled to the one or more memories, the one or more processors individually or collectively configured to cause the device to perform the method of one or more of Aspects 18-22.

Aspect 69: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 23-30.

Aspect 70: An apparatus for wireless communication at a device, the apparatus comprising one or more memories and one or more processors coupled to the one or more memories, the one or more processors configured to cause the device to perform the method of one or more of Aspects 23-30.

Aspect 71: An apparatus for wireless communication, the apparatus comprising at least one means for performing the method of one or more of Aspects 23-30.

Aspect 72: A non-transitory computer-readable medium storing code for wireless communication, the code comprising instructions executable by one or more processors to perform the method of one or more of Aspects 23-30.

Aspect 73: A non-transitory computer-readable medium storing a set of instructions for wireless communication, the set of instructions comprising one or more instructions that, when executed by one or more processors of a device, cause the device to perform the method of one or more of Aspects 23-30.

Aspect 74: A device for wireless communication, the device comprising a processing system that includes one or more processors and one or more memories coupled with the one or more processors, the processing system configured to cause the device to perform the method of one or more of Aspects 23-30.

Aspect 75: An apparatus for wireless communication at a device, the apparatus comprising one or more memories and one or more processors coupled to the one or more memories, the one or more processors individually or collectively configured to cause the device to perform the method of one or more of Aspects 23-30.

Aspect 76: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 31-43.

Aspect 77: An apparatus for wireless communication at a device, the apparatus comprising one or more memories and one or more processors coupled to the one or more memories, the one or more processors configured to cause the device to perform the method of one or more of Aspects 31-43.

Aspect 78: An apparatus for wireless communication, the apparatus comprising at least one means for performing the method of one or more of Aspects 31-43.

Aspect 79: A non-transitory computer-readable medium storing code for wireless communication, the code comprising instructions executable by one or more processors to perform the method of one or more of Aspects 31-43.

Aspect 80: A non-transitory computer-readable medium storing a set of instructions for wireless communication, the set of instructions comprising one or more instructions that, when executed by one or more processors of a device, cause the device to perform the method of one or more of Aspects 31-43.

Aspect 81: A device for wireless communication, the device comprising a processing system that includes one or more processors and one or more memories coupled with the one or more processors, the processing system configured to cause the device to perform the method of one or more of Aspects 31-43.

Aspect 82: An apparatus for wireless communication at a device, the apparatus comprising one or more memories and one or more processors coupled to the one or more memories, the one or more processors individually or collectively configured to cause the device to perform the method of one or more of Aspects 31-43.

Aspect 83: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 44-47.

Aspect 84: An apparatus for wireless communication at a device, the apparatus comprising one or more memories and one or more processors coupled to the one or more memories, the one or more processors configured to cause the device to perform the method of one or more of Aspects 44-47.

Aspect 85: An apparatus for wireless communication, the apparatus comprising at least one means for performing the method of one or more of Aspects 44-47.

Aspect 86: A non-transitory computer-readable medium storing code for wireless communication, the code comprising instructions executable by one or more processors to perform the method of one or more of Aspects 44-47.

Aspect 87: A non-transitory computer-readable medium storing a set of instructions for wireless communication, the set of instructions comprising one or more instructions that, when executed by one or more processors of a device, cause the device to perform the method of one or more of Aspects 44-47.

Aspect 88: A device for wireless communication, the device comprising a processing system that includes one or more processors and one or more memories coupled with the one or more processors, the processing system configured to cause the device to perform the method of one or more of Aspects 44-47.

Aspect 89: An apparatus for wireless communication at a device, the apparatus comprising one or more memories and one or more processors coupled to the one or more memories, the one or more processors individually or collectively configured to cause the device to perform the method of one or more of Aspects 44-47.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. An apparatus for wireless communication at a network node, comprising:

one or more memories; and one or more processors, coupled to the one or more memories, configured to cause the network node to:

receive an automatic gain control (AGC) headroom capability that is supported by a first user equipment (UE); and adjust, based at least in part on the AGC headroom capability, a transmission power level for an uplink transmission from a second UE that is transmitted in a same orthogonal frequency division multiplexing (OFDM) symbol as a downlink transmission to the first UE.

2. The apparatus of claim 1, wherein the one or more processors, to cause the network node to adjust the transmission power level, are configured to cause the network node to:

adjust the transmission power level to mitigate saturation of hardware at the first UE.

3. The apparatus of claim 1, wherein the AGC headroom capability includes a low noise amplifier headroom capability that is applicable to multiple modulation and coding schemes.

4. The apparatus of claim 1, wherein the AGC headroom capability includes multiple low noise amplifier (LNA) headroom capabilities, and wherein each LNA headroom capability of the multiple LNA headroom capabilities is applicable to a respective modulation and coding scheme.

5. The apparatus of claim 1, wherein the AGC headroom capability includes multiple low noise amplifier (LNA) headroom capabilities, and wherein each LNA headroom capability of the multiple LNA headroom capabilities is applicable to a respective modulation and coding scheme group.

6. The apparatus of claim 1, wherein the one or more processors are further configured to cause the network node to:

receive one or more measurement metrics from the first UE; and calculate an adjustment value for the transmission power level of the second UE based at least in part on the one or more measurement metrics from the first UE and the AGC headroom capability, wherein the one or more processors, to cause the network node to adjust the transmission power level, are configured to cause the network node to:

adjust the transmission power level using the adjustment value.

7. The apparatus of claim 6, wherein the one or more measurement metrics from the first UE comprise at least one of:

an inter-UE cross-link interference (CLI) metric; or a reference signal received power (RSRP) metric.

8. The apparatus of claim 1, wherein the one or more processors are further configured to cause the network node to:

receive a UE capability indication from the first UE that indicates support for AGC headroom capability reporting.

9. The apparatus of claim 1, wherein the one or more processors are further configured to cause the network node to:

obtain one or more cross-link interference (CLI) metrics that are based at least in part on the first UE and the second UE; and schedule at least one of the first UE or the second UE using the one or more CLI metrics.

10. A method of wireless communication performed by a network node, comprising:

receiving an automatic gain control (AGC) headroom capability that is supported by a first user equipment (UE); and adjusting, based at least in part on the AGC headroom capability, a transmission power level for an uplink transmission from a second UE that is transmitted in a same orthogonal frequency division multiplexing (OFDM) symbol as a downlink transmission to the first UE.

11. The method of claim 10, wherein adjusting the transmission power level comprises:

adjusting the transmission power level to mitigate saturation of hardware at the first UE.

12. The method of claim 10, wherein the AGC headroom capability includes a low noise amplifier headroom capability that is applicable to multiple modulation and coding schemes.

13. The method of claim 10, wherein the AGC headroom capability includes multiple low noise amplifier (LNA) headroom capabilities, and wherein each LNA headroom capability of the multiple LNA headroom capabilities is applicable to a respective modulation and coding scheme.

14. The method of claim 10, wherein the AGC headroom capability includes multiple low noise amplifier (LNA) headroom capabilities, and wherein each LNA headroom capability of the multiple LNA headroom capabilities is applicable to a respective modulation and coding scheme group.

15. The method of claim 10, comprising:

receiving one or more measurement metrics from the first UE; and calculating an adjustment value for the transmission power level of the second UE based at least in part on the one or more measurement metrics from the first UE and the AGC headroom capability; and adjusting the transmission power level using the adjustment value.

16. The method of claim 15, wherein the one or more measurement metrics from the first UE comprise at least one of:

an inter-UE cross-link interference (CLI) metric; or a reference signal received power (RSRP) metric.

17. The method of claim 10, comprising:

receiving a UE capability indication from the first UE that indicates support for AGC headroom capability reporting.

18. The method of claim 10, comprising:

obtaining one or more cross-link interference (CLI) metrics that are based at least in part on the first UE and the second UE; and scheduling at least one of the first UE or the second UE using the one or more CLI metrics.

19. A non-transitory computer-readable medium storing a set of instructions for wireless communication, the set of instructions comprising:

one or more instructions that, when executed by one or more processors of a network node, cause the network node to:

receive an automatic gain control (AGC) headroom capability that is supported by a first user equipment (UE); and adjust, based at least in part on the AGC headroom capability, a transmission power level for an uplink transmission from a second UE that is transmitted in a same orthogonal frequency division multiplexing (OFDM) symbol as a downlink transmission to the first UE.

20. The non-transitory computer-readable medium of claim 19, wherein the one or more instructions that, when executed by one or more processors of the network node, cause the network node to adjust the transmission power level, further cause the network node to:

adjust the transmission power level to mitigate saturation of hardware at the first UE.

21. The non-transitory computer-readable medium of claim 19, wherein the AGC headroom capability includes a low noise amplifier headroom capability that is applicable to multiple modulation and coding schemes.

22. The non-transitory computer-readable medium of claim 19, wherein the AGC headroom capability includes multiple low noise amplifier (LNA) headroom capabilities, and wherein each LNA headroom capability of the multiple LNA headroom capabilities is applicable to a respective modulation and coding scheme.

23. The non-transitory computer-readable medium of claim 19, wherein the AGC headroom capability includes multiple low noise amplifier (LNA) headroom capabilities, and wherein each LNA headroom capability of the multiple LNA headroom capabilities is applicable to a respective modulation and coding scheme group.

24. The non-transitory computer-readable medium of claim 19, wherein the one or more instructions further cause the network node to:

receive one or more measurement metrics from the first UE; and calculate an adjustment value for the transmission power level of the second UE based at least in part on the one or more measurement metrics from the first UE and the AGC headroom capability, wherein the one or more instructions that, when executed by one or more processors of the network node, cause the network node to adjust the transmission power level, further cause the network node to:

adjust the transmission power level using the adjustment value.

25. The non-transitory computer-readable medium of claim 24, wherein the one or more measurement metrics from the first UE comprise at least one of:

an inter-UE cross-link interference (CLI) metric; or a reference signal received power (RSRP) metric.

26. The non-transitory computer-readable medium of claim 19, wherein the one or more instructions further cause the network node to:

receive a UE capability indication from the first UE that indicates support for AGC headroom capability reporting.

27. The non-transitory computer-readable medium of claim 19, wherein the one or more instructions further cause the network node to:

obtain one or more cross-link interference (CLI) metrics that are based at least in part on the first UE and the second UE; and schedule at least one of the first UE or the second UE using the one or more CLI metrics.

28. An apparatus for wireless communication, comprising:

means for receiving an automatic gain control (AGC) headroom capability that is supported by a first user equipment (UE); and means for adjusting, based at least in part on the AGC headroom capability, a transmission power level for an uplink transmission from a second UE that is transmitted in a same orthogonal frequency division multiplexing (OFDM) symbol as a downlink transmission to the first UE.

29. The apparatus of claim 28, further comprising:

means for adjusting the transmission power level to mitigate saturation of hardware at the first UE.

30. The apparatus of claim 28, wherein the AGC headroom capability includes a low noise amplifier headroom capability that is applicable to multiple modulation and coding schemes.

* * * * *